(12) United States Patent
Fronk et al.

(10) Patent No.: US 9,194,278 B2
(45) Date of Patent: Nov. 24, 2015

(54) ENGINE

(71) Applicant: Polaris Industries Inc., Medina, MN (US)

(72) Inventors: Matthew R. Fronk, Stillwater Township, MN (US); Michael C. Bartholomew, Leicestershire (GB); Urs Wenger, Rumisberg (CH); Hans-Rudolf Jenni, Grasswil (CH); Blaine D. Kaeser, Chisago City, MN (US); Neil A. Wright, Coalville (GB)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/214,033

(22) Filed: Mar. 14, 2014

(65) Prior Publication Data

US 2014/0261258 A1  Sep. 18, 2014

Related U.S. Application Data

(60) Provisional application No. 61/801,033, filed on Mar. 15, 2013.

(51) Int. Cl.

| F01P 5/10 | (2006.01) |
|---|---|
| F01P 5/12 | (2006.01) |
| F01L 1/053 | (2006.01) |
| F02F 1/10 | (2006.01) |
| F02F 7/00 | (2006.01) |
| F02B 67/04 | (2006.01) |
| F01L 1/047 | (2006.01) |
| F01P 3/02 | (2006.01) |

(52) U.S. Cl.
CPC . *F01P 5/12* (2013.01); *F01L 1/053* (2013.01); *F02B 67/04* (2013.01); *F02F 1/10* (2013.01); *F02F 7/006* (2013.01); *F01L 2001/0476* (2013.01); *F01P 2003/021* (2013.01); *F02F 2001/104* (2013.01)

(58) Field of Classification Search
USPC .............................. 123/198 C, 90.31, 41.44
See application file for complete search history.

(56) References Cited

U.S. PATENT DOCUMENTS

| 1,461,711 | A | * | 7/1923 | Bull ........................... 123/41.28 |
|---|---|---|---|---|
| 4,756,280 | A | * | 7/1988 | Tamba et al. ............... 123/41.47 |
| 6,378,478 | B1 | * | 4/2002 | Lagies ........................ 123/90.31 |
| 2002/0000210 | A1 | * | 1/2002 | Shinpo et al. .............. 123/41.74 |

* cited by examiner

*Primary Examiner* — Hung Q Nguyen
(74) *Attorney, Agent, or Firm* — Faegre Baker Daniels LLP

(57) ABSTRACT

An engine is disclosed of the V-configuration having an integrated engine and transmission. The engine has a crankshaft which directly couples to drive the water pump, oil pump and transmission clutch. The water pump has a drive shaft coupled to the crankshaft that extends across the crankcase from a first to a second side. The water pump includes a housing where at least a portion is defined in the face of the crankshaft.

25 Claims, 37 Drawing Sheets

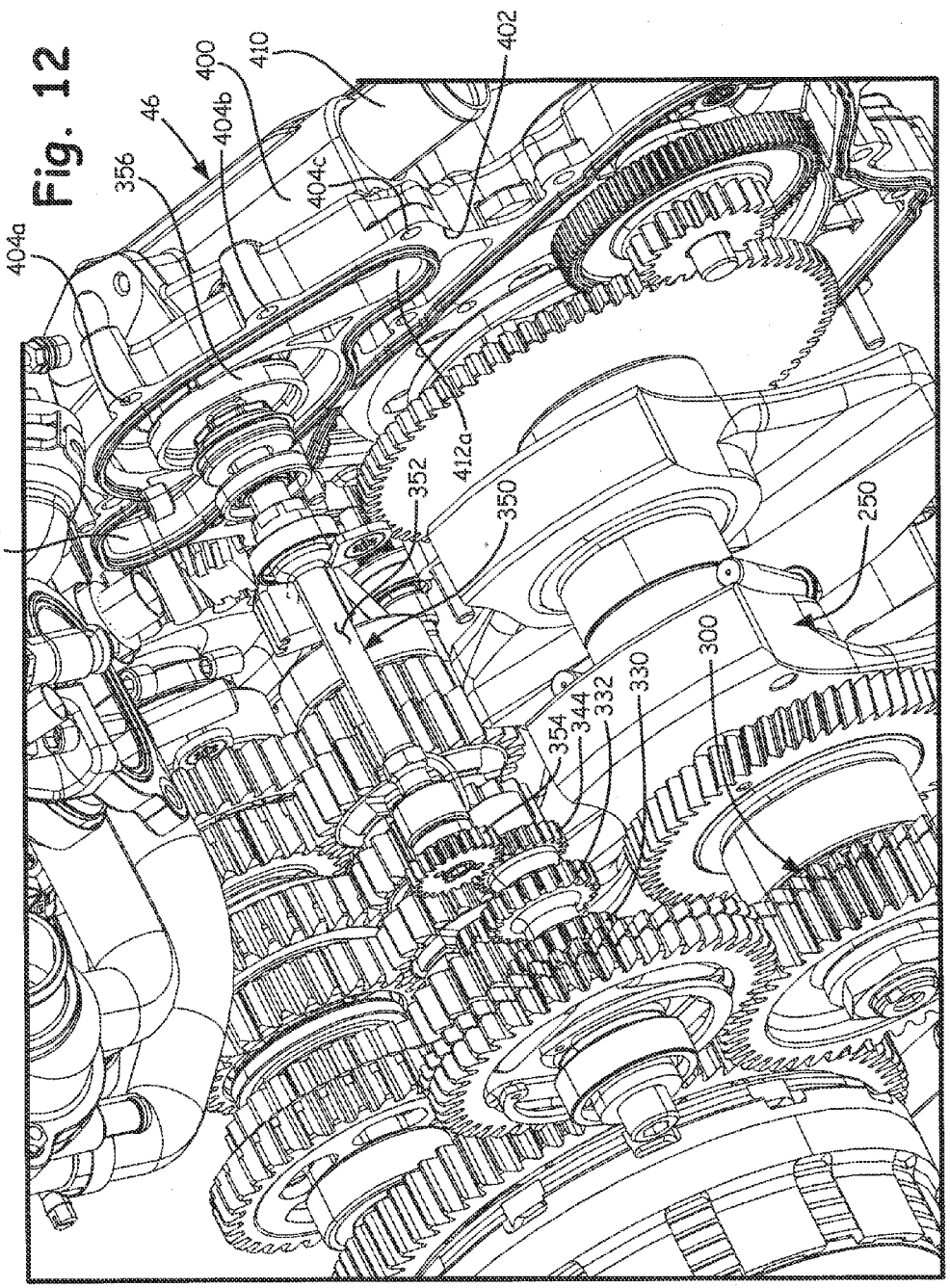

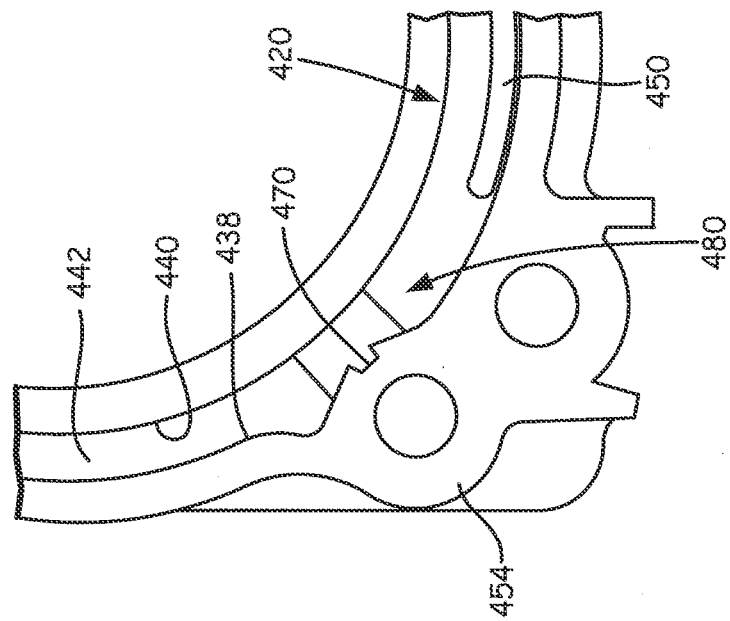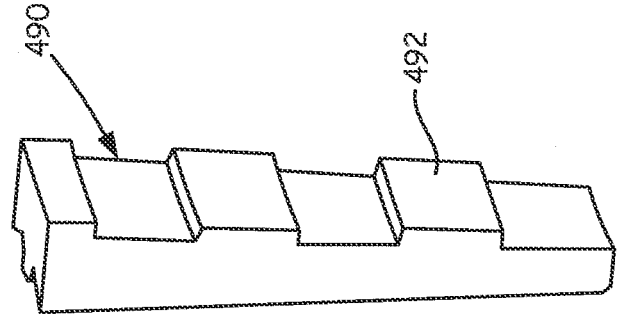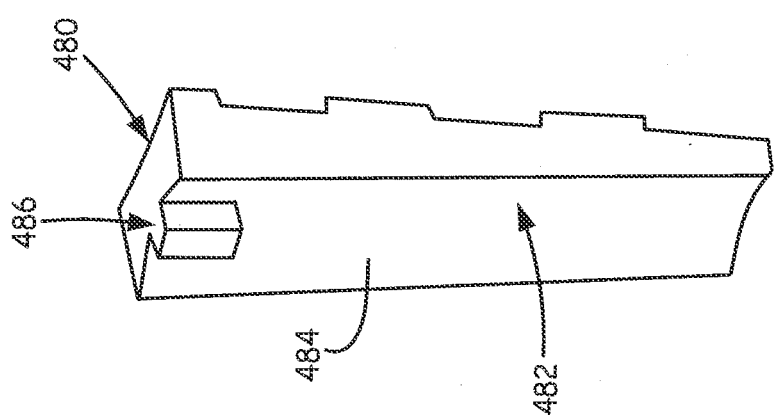

ENGINE

This application claims priority from U.S. Provisional application Ser. No. 61/801,033, filed Mar. 15, 2013, the subject matter of which is incorporated herein by reference.

BACKGROUND OF THE DISCLOSURE

The present disclosure generally relates to an engine and more particularly to an engine having improved mechanical efficiencies.

Multiple different engine types are known, for example, multiple fuel types are available, and multiple different sized engines are available, together with different numbers of cylinders. Engines may also be 2 or 4 stroke, and have cylinders positioned at multiple different orientations, for example the piston(s) may be oriented vertically, horizontally, in a V-configuration (V-twin) or at any other possible orientation. The engine may also be incorporated into a powertrain including an integrated transmission. The subject disclosure is applicable to all types of such engines.

Some engines are shown for example in U.S. Pat. Nos. 8,011,342 and 8,269,457; and in patent application Ser. No. 13/242,239 filed Sep. 23, 2011 (US Publication Number 20120073527); the disclosures of which are expressly incorporated herein by reference.

SUMMARY OF THE DISCLOSURE

In a first embodiment, an engine is disclosed comprising a crankcase; a crankshaft journalled in the crankcase; a piston coupled to the crankshaft; and a cylinder in which the piston reciprocates. A head is positioned over the piston and cylinder, the head including a first aperture therethrough profiled for a spark plug. At least one camshaft is positioned in the head and over the cylinder. A cam retainer is positioned over the cam to retain the cam to the head, the cam retainer comprising a second aperture profiled to at least partially overlie the first aperture, the cam retainer being in a sealed relation with the head at the interface of the first and second apertures. A valve cover is receivable over the head and cam retainer, and has a third aperture therethrough, the third aperture being profiled to at least partially overlie the second aperture, the valve cover being in a sealed relation with the cam retainer at the interface of the second and third apertures.

In another embodiment, an engine comprises a crankcase profiled in a V-configuration having two cylinders, each having a cylinder bore. A head is positioned over each of the cylinders. A crankshaft is journalled in the crankcase. Two pistons are coupled to the crankshaft and are positioned in respective cylinders to reciprocate therein. A water pump is coupled to the crankshaft, the water pump comprising a water pump drive shaft having a drive end and an impeller end. The drive end of the water pump shaft is positioned on a first side of the crankcase and the impeller is positioned on a second side of the crankcase.

In another embodiment an engine comprises a crankcase profiled in a V-configuration; two cylinders, each having a cylinder bore; a head positioned over each of the cylinders; a crankshaft journalled in the crankcase; and two pistons coupled to the crankshaft and positioned in respective cylinders to reciprocate therein. A water pump is coupled to the crankshaft, the water pump comprising a water pump housing, wherein at least a portion of the water pump housing is defined in the outer face of the crankcase.

In yet another embodiment, a powertrain comprises a crankcase; a cylinder having a cylinder bore; a head positioned over the cylinder; a crankshaft journalled in the crankcase; a piston coupled to the crankshaft and positioned in the cylinder to reciprocate therein; a drive gear fixedly coupled to the crankshaft and rotatable therewith; and first, second and third driven gears is meshing engagement with the drive gear and driving other components of the powertrain.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 12 is an upper perspective view viewed rearwardly above the crank shaft;

FIG. 16A is a perspective view of an insert for location in the water channel of the cylinder of FIG. 13;

FIG. 16B is a perspective view of the opposite side of the insert of FIG. 16A;

FIG. 16C shows the insert positioned in the water channel of the cylinder;

DETAILED DESCRIPTION OF THE DRAWINGS

Figure 1:
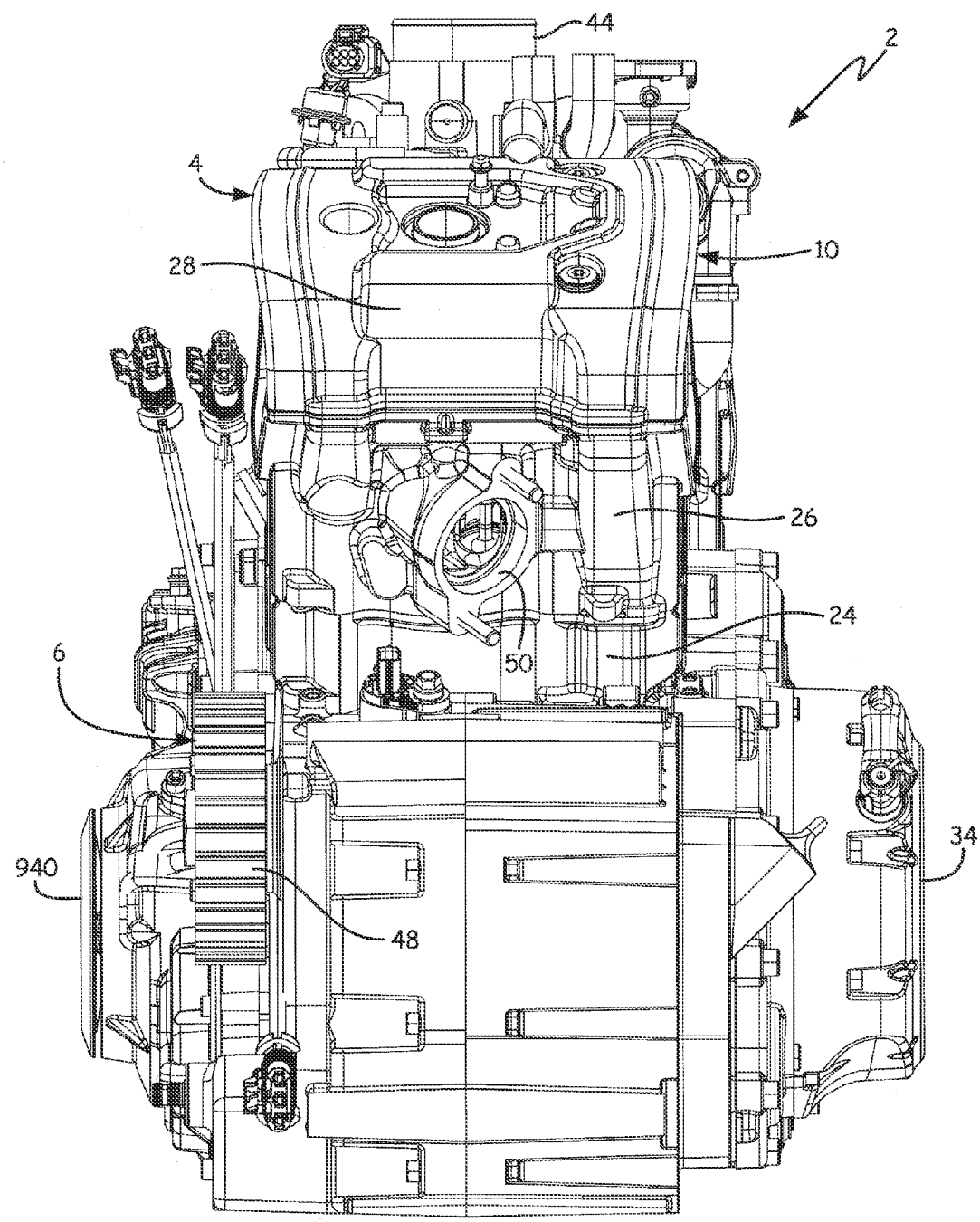
FIG. 1 is a rear view of the power train.

Corresponding reference characters indicate corresponding parts throughout the several views. Unless stated otherwise the drawings are proportional. The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a motorcycle engine it should be understood that the features disclosed herein may have application to other power sports vehicles as well, such as ATVs, snowmobiles, utility vehicles, watercraft, etc.

Figure 2:
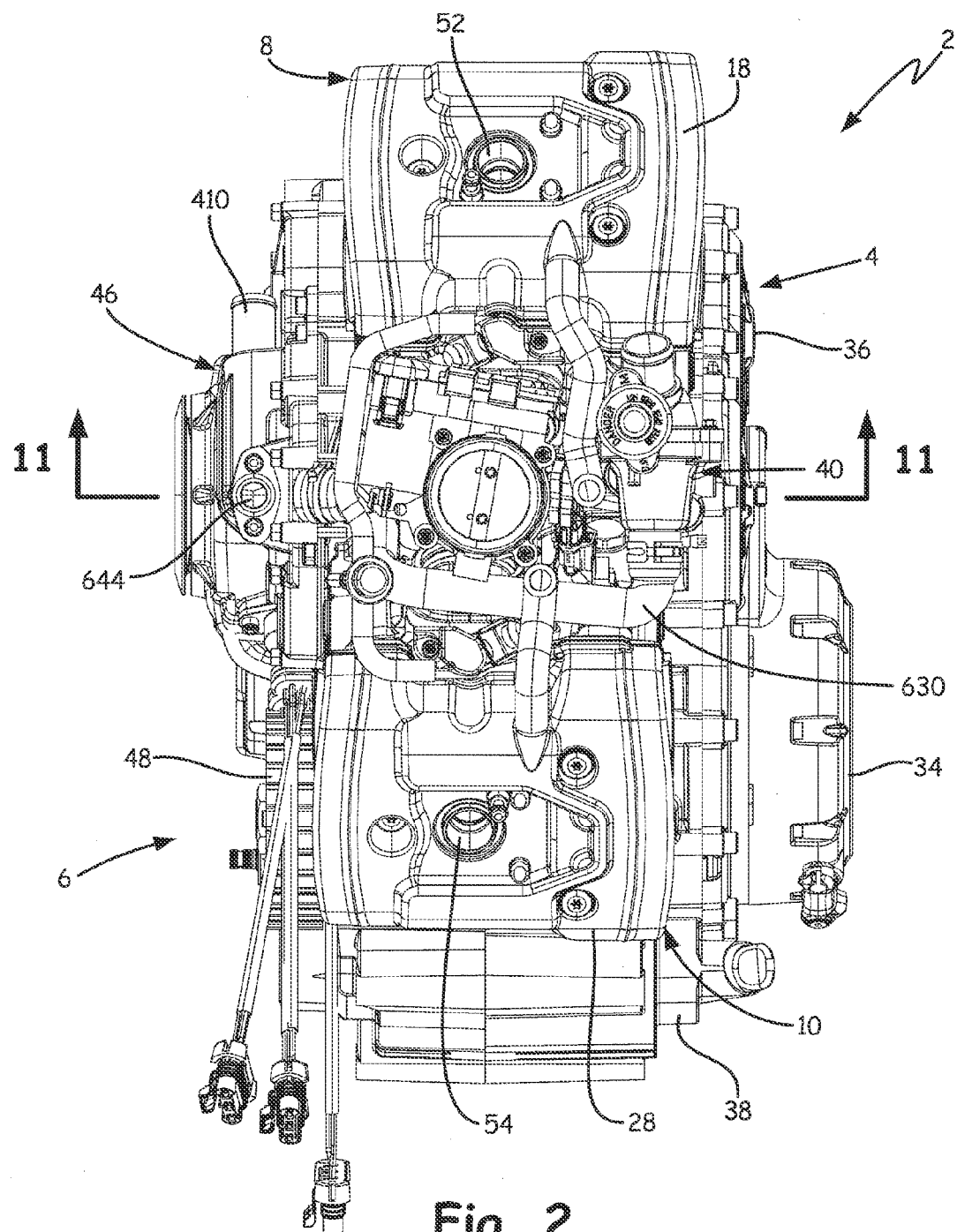
FIG. 2 is a top view of the power train of FIG. 1.
Figure 3:
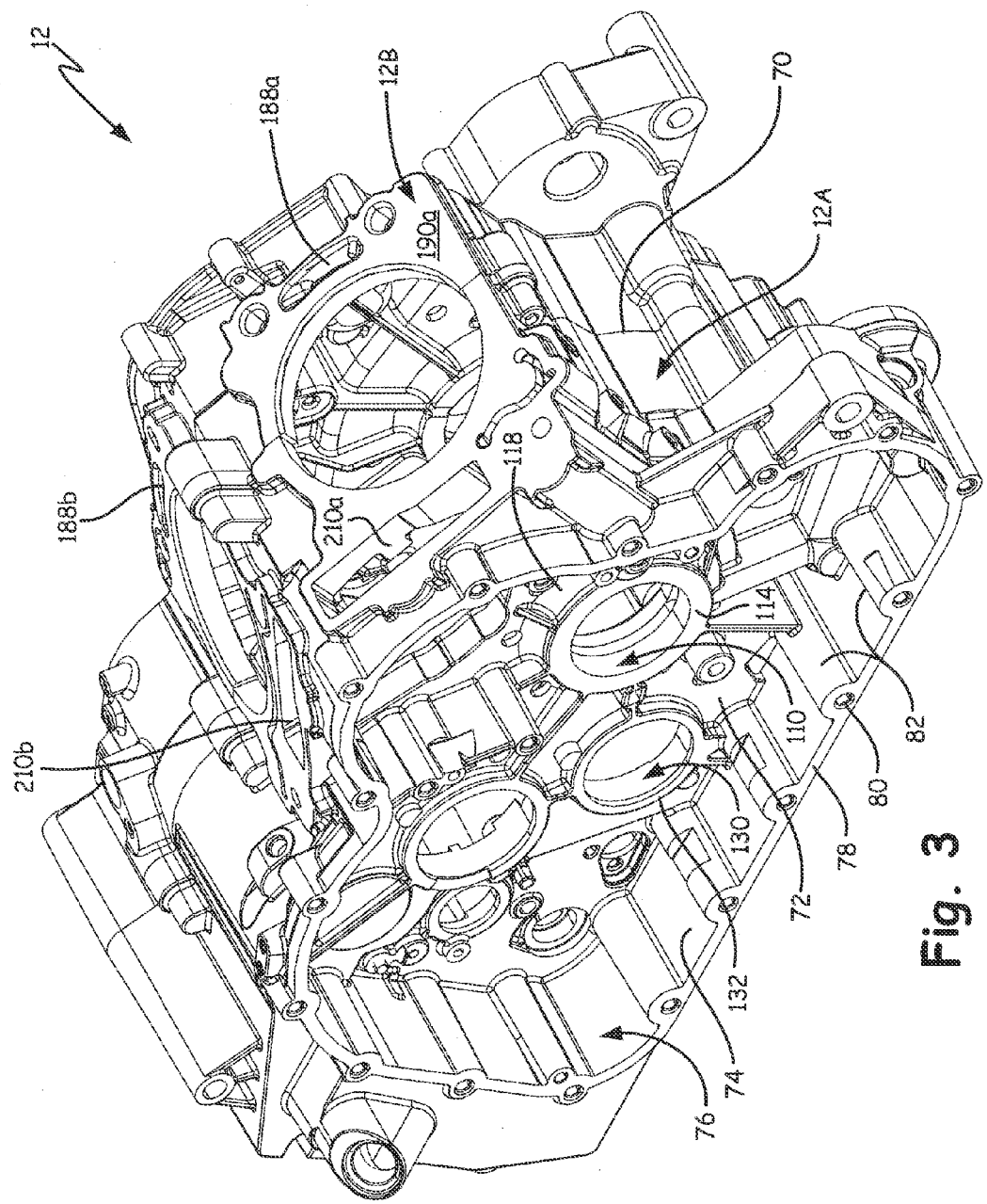
FIG. 3 is a right front perspective view of the block of the power train of FIGS. 1-2.

With reference first to FIGS. 1-3, a power train is shown generally at 2. Power train 2 is intended for a motorcycle, but could be used as a power train for other vehicles as well. Power train 2 is a combination of an engine and a transmission in a single module, where the engine portion is shown at 4 and the transmission portion is shown at 6. Power train 2 includes a front cylinder assembly 8 (FIG. 2) and a rear cylinder assembly 10. A unified block 12 (FIG. 3) is provided for both the engine and the transmission portions 4, 6. As shown, front cylinder assembly 8 is comprised of a front cylinder 14 (FIG. 21), front head 16 (FIG. 21), and front valve cover 18 (FIG. 2). As best shown in FIG. 1, rear cylinder assembly 10 is comprised of a rear cylinder member 24, a rear head 26, and a rear valve cover 28. Clutch cover 34 is coupled to the block 12 at the rear transmission portion 6. A gear cover 36 (FIG. 2) is coupled to the block 12 at a front end thereof at the engine portion 4 to cover multiple gear shafts as described herein. Block 12 defines an engine crankcase and a transmission housing.

Power train 2 includes an oil filter at 38 (FIG. 2); a thermostat assembly 40 (FIG. 2); front exhaust port 42 (FIG. 18); and throttle 44 (FIG. 1). Power train further includes water pump 46 (FIG. 2) and output drive sprocket 48 (FIG. 2). Rear exhaust port 50 is shown in FIG. 1. Finally, power train 2 includes front and rear spark plug opening 52, 54 as shown in FIG. 2.

With reference now to FIGS. 3-8, power train block 12 will be described in greater detail. With reference first to FIG. 3, block 12 is comprised of two halves, 12a and 12b. With reference still to FIG. 3, block portion 12a includes an inner wall at 72 defined by a perimeter wall at 74 defining an internal volume at 76. Internal wall 74 is machined to define a planar edge at 78 having a plurality of threaded apertures 80 defined within bosses 82. In a like manner, and with reference to FIG. 6, block portion 12b includes an inner wall 92 having a perimeter wall 94 defining an internal volume at 96. Wall 94 defines a planar edge at 98 having threaded apertures 100 defined within bosses 102.

Figure 5:
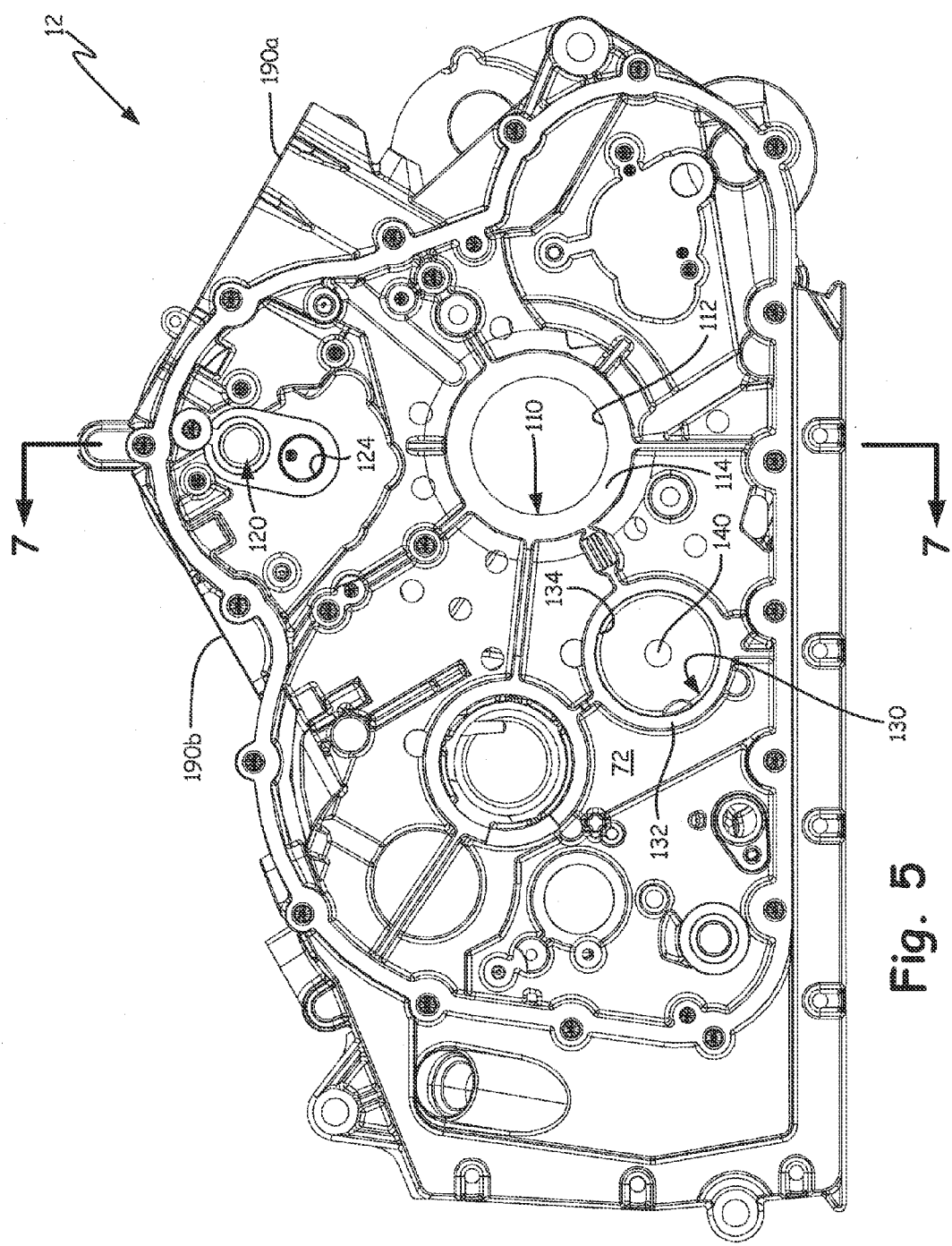
FIG. 5 is a left side view of the block of FIG. 3.
Figure 6:
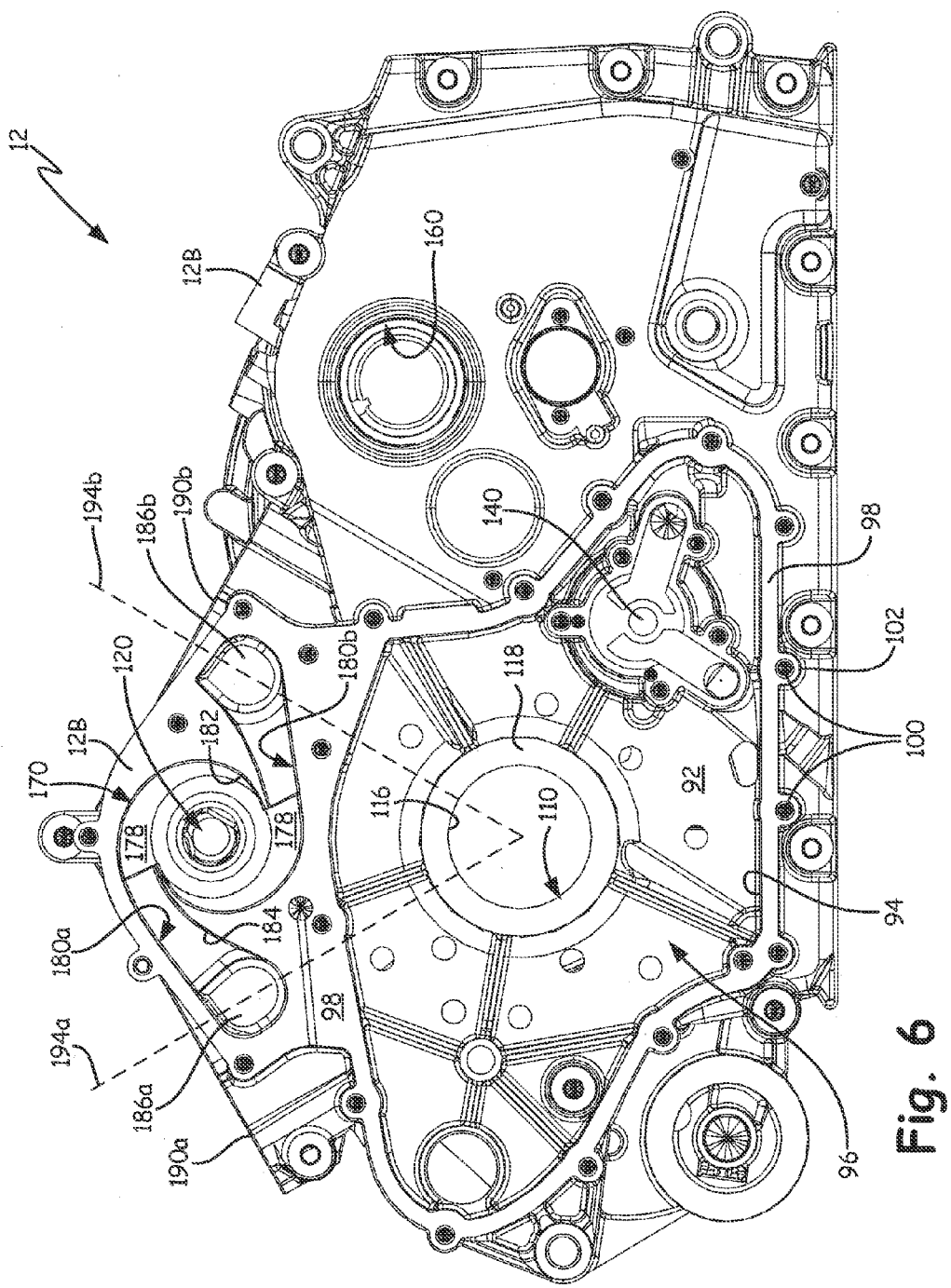
FIG. 6 is a right side view of the block of FIG. 3.
Figure 7:
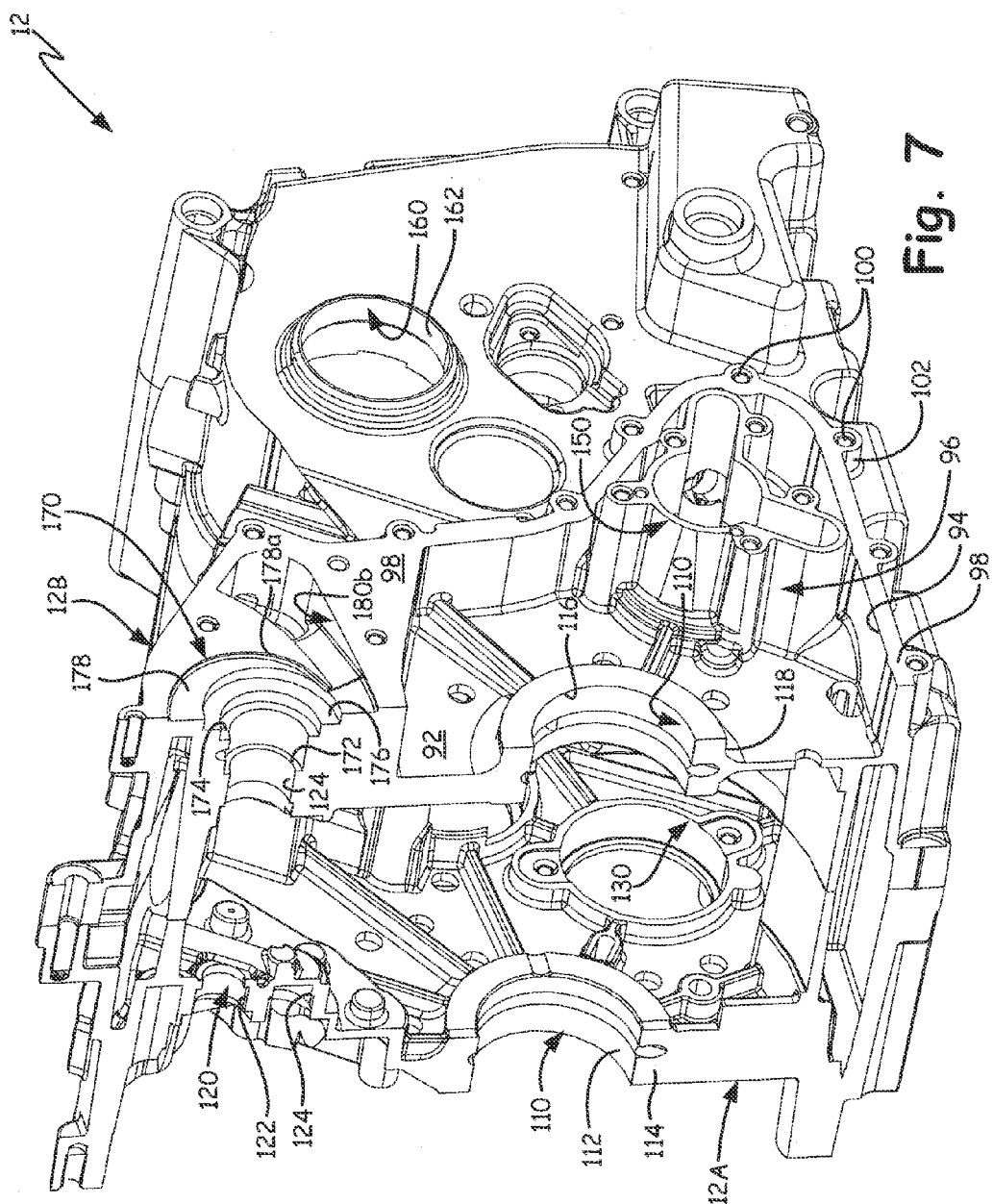
FIG. 7 is a cross-sectional view through lines 9-9 of FIG. 5.

With reference now to FIGS. 3 and 5, multiple apertures extend completely through block 12 through both walls 72, 92 as described herein. As shown, aperture 110 is defined by inner diameter 112 of boss 114 (FIG. 5); and by diameter 116 defined by boss 118 (FIG. 6). Aperture 110 is profiled for the mounting of a crank shaft as described herein. With reference now to FIGS. 5-7, through aperture 120 is shown for a water pump drive shaft as described herein. Aperture 120 is defined by diameter 122 on block half 12a and diameter 124 on block half 12b, as shown in FIG. 7.

With reference now to FIGS. 3 and 6, a through aperture 130 for mounting a clutch will be described in greater detail herein. Aperture 130 is defined by a boss 132 and defines an internal diameter 134 (FIG. 5). Aperture 130 communicates with opening 140 (FIG. 6), which resides within housing 150, as further described herein. Block portion 12b further includes an aperture at 160 having a diameter at 162 for receiving an output shaft carrying drive sprocket 48.

With reference now to FIGS. 6 and 7, a water pump housing 170 is defined integral with block portion 12b. Water pump housing 170 includes multiple steps including 172, 174, 176, and 178, where step 178 defines the convolutes 180a, 180b (FIG. 6) for the discharge water through housing 170. As shown in FIG. 6, convolutes 180a, 180b are spiraled having a portion 182 intersecting with stepped portion 178, which spirals outwardly and together with portion 184 forms a water channel as a recess from planar surface 98. The convolutes 180a, 180b lead into openings 186, which move rearwardly as viewed in FIG. 6 to communicate with openings 188 as best viewed in FIG. 8. Water openings 188 extend up to the upper planar surface 190 of the block 12, which surface is profiled to receive cylinder 14 as further described herein. Thus passageways are defined between the convolutes 180a, 180b and upper faces 190a, 190b where portions 186a, 186b extend into the crankcase along an axis generally parallel with the rotational axis of the crankshaft; and portions 188a, 188b extend into the crankcase along an axis generally parallel with an axis of the cylinder bore.

Figure 8:
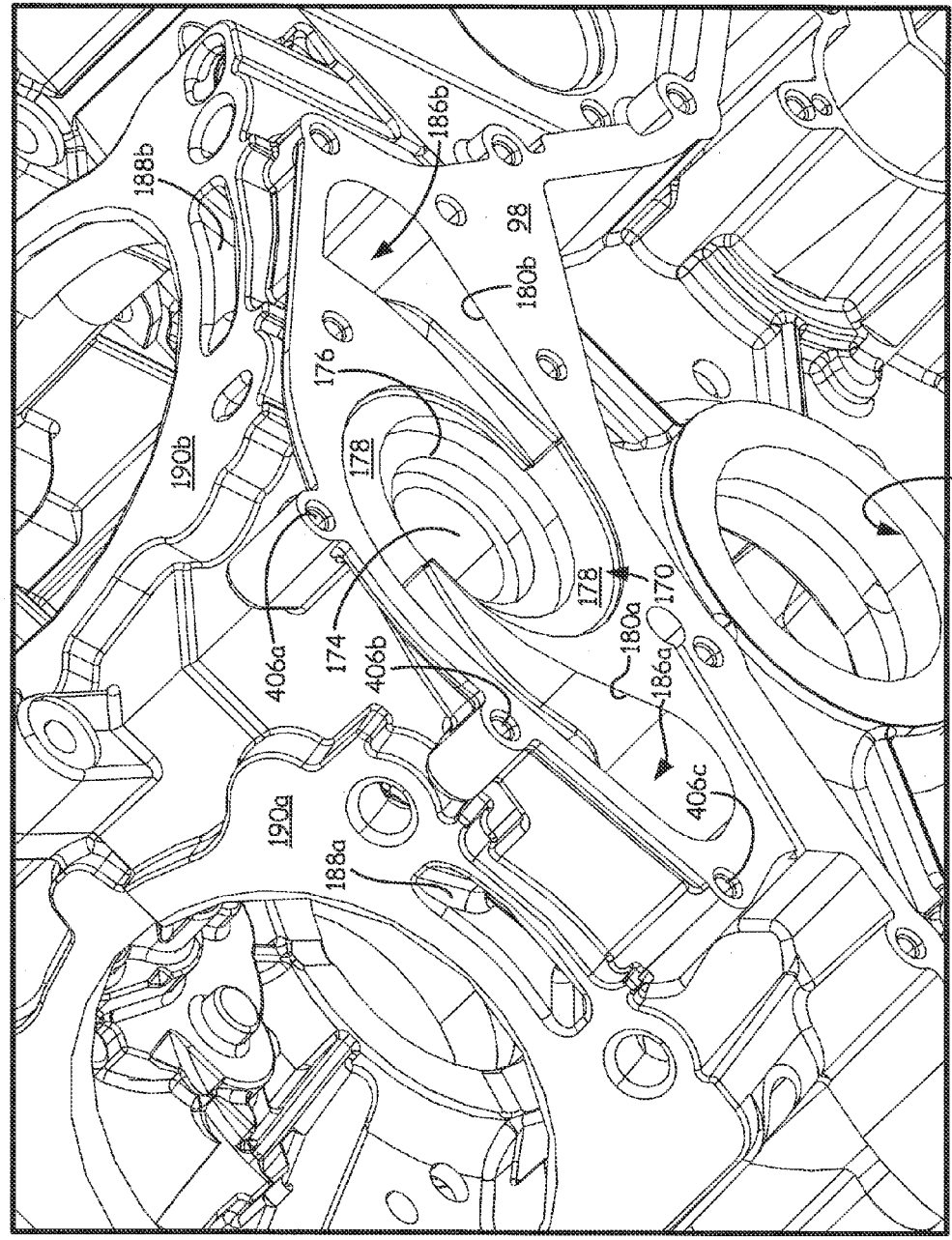
FIG. 8 is an enlarged perspective view showing the water pump cavity.

It should be appreciated from viewing FIG. 8 that a single water pump housing 170 is integrally defined in the face 98 and defines two convolutes 180a and 180b where convolute 180a will feed cooling water to front cylinder assembly 8 and convolute 180b will feed water to rear cylinder assembly 10 as further described herein.

With reference to FIG. 6, it should be appreciated that through opening 120 is within the "V" defined by the centerlines 194a and 194b, which extend through the center of opening 110 and which are perpendicular to the planar surfaces 190a, 190b. It should be appreciated that centerlines 194a and 194b define an acute angle and also represent the centerline of the pistons within engine portion 4. As shown in FIGS. 6 and 8, centerline 194a intersects openings 186a, 188a while centerline 194b intersects opening 186b, 188b. As shown, centerline 194a generally bisects openings 186a, 188a while centerline 194b generally bisects opening 186b, 188b.

Figure 4:
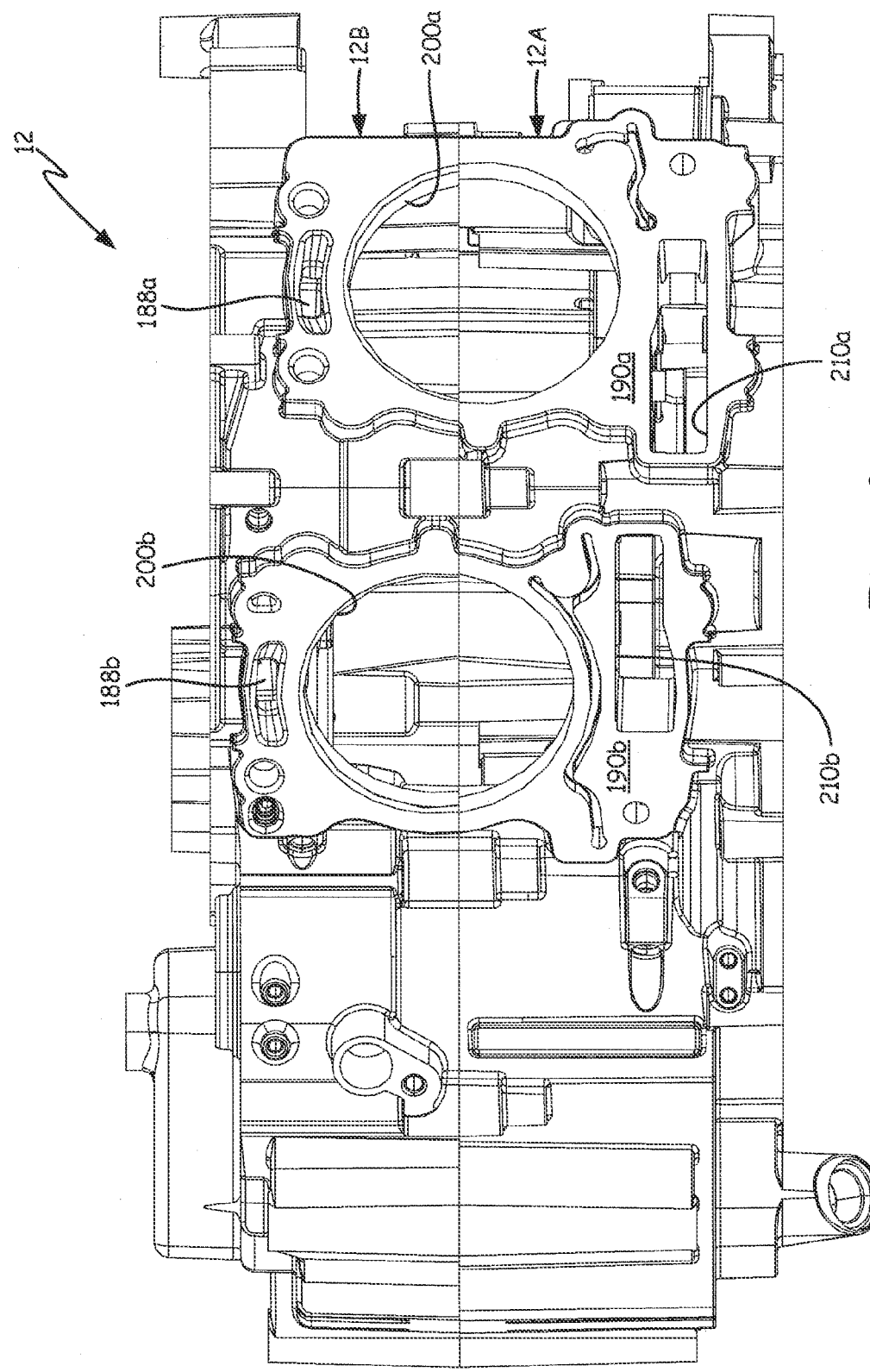
FIG. 4 is a top view of the block of FIG. 3.

With reference now to FIG. 4, it should be appreciated that upper planar surfaces 190a and 190b are defined by the two block halves 12a and 12b. Openings 200a and 200b are also provided defining a receiving area for cylinders 14, 24, respectively, as further described herein. With reference to FIGS. 3 and 4, block half 12a includes passageway 210a through surface 190a and passageway 210b extending through surface 190b, respectively. It should be appreciated that passageways 210a and 210b open into the open volume 76 (FIG. 3), and provide access for cam chains as described herein.

Figure 9:
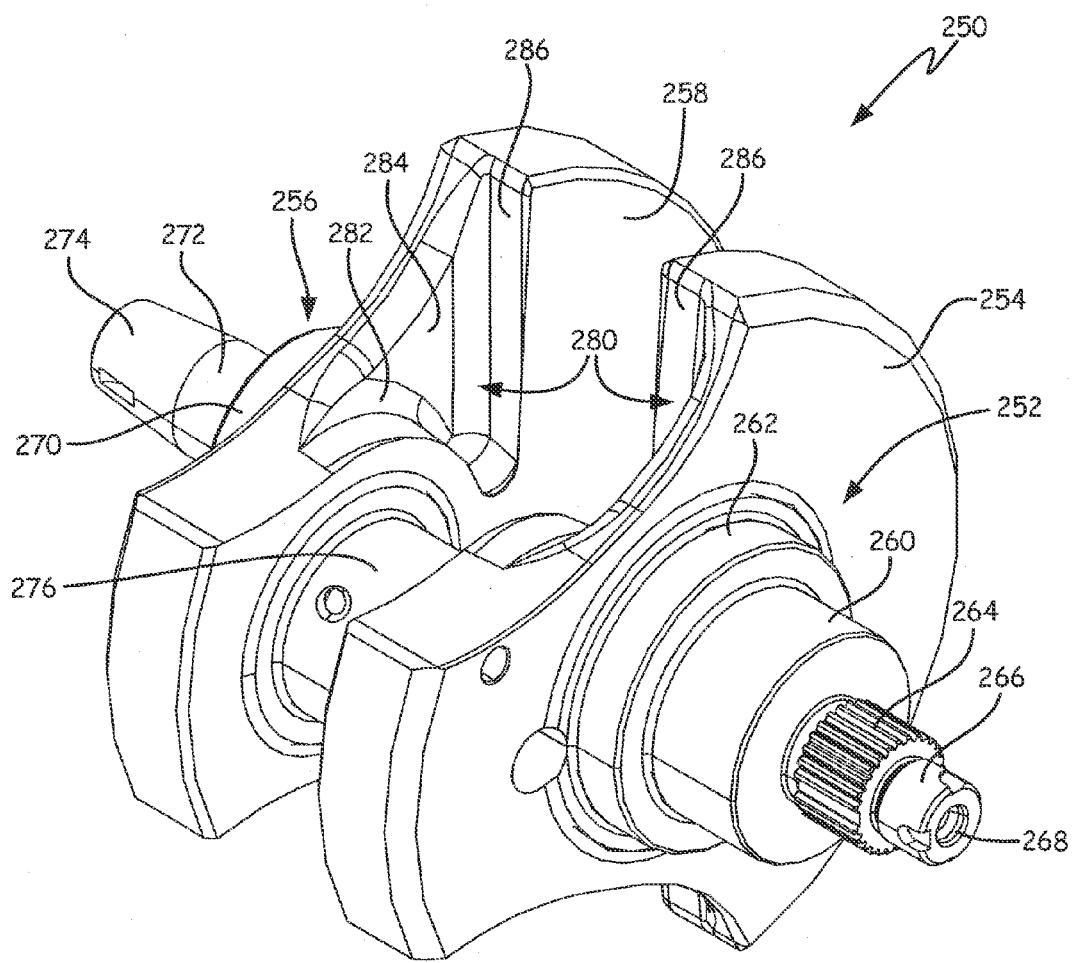
FIG. 9 is a perspective view of the crank shaft of the present disclosure.

With reference now to FIG. 9, an engine crankshaft is shown at 250. Engine crank shaft 250 includes a shaft portion 252 extending from counterweight 254 and a shaft portion 256 extending from counterweight 258. Shaft portion 252 includes main journal 260, increased diameter portion 262 splined shaft portion 264 and post portion 266 having a threaded aperture at 268. Shaft portion 256 includes main journal 270, shaft portion 272, and tapered shaft portion 274. Crankshaft 250 further includes a crank pin journal 276 extending between counterweights 254, 258. A reduced mass portion 280 is provided as a hollowed out portion of counterweights 254 and 258 on an inside thereof defining an arcuate surface 282, a wall portion at 284, and a planar portion at 286.

Figure 10:
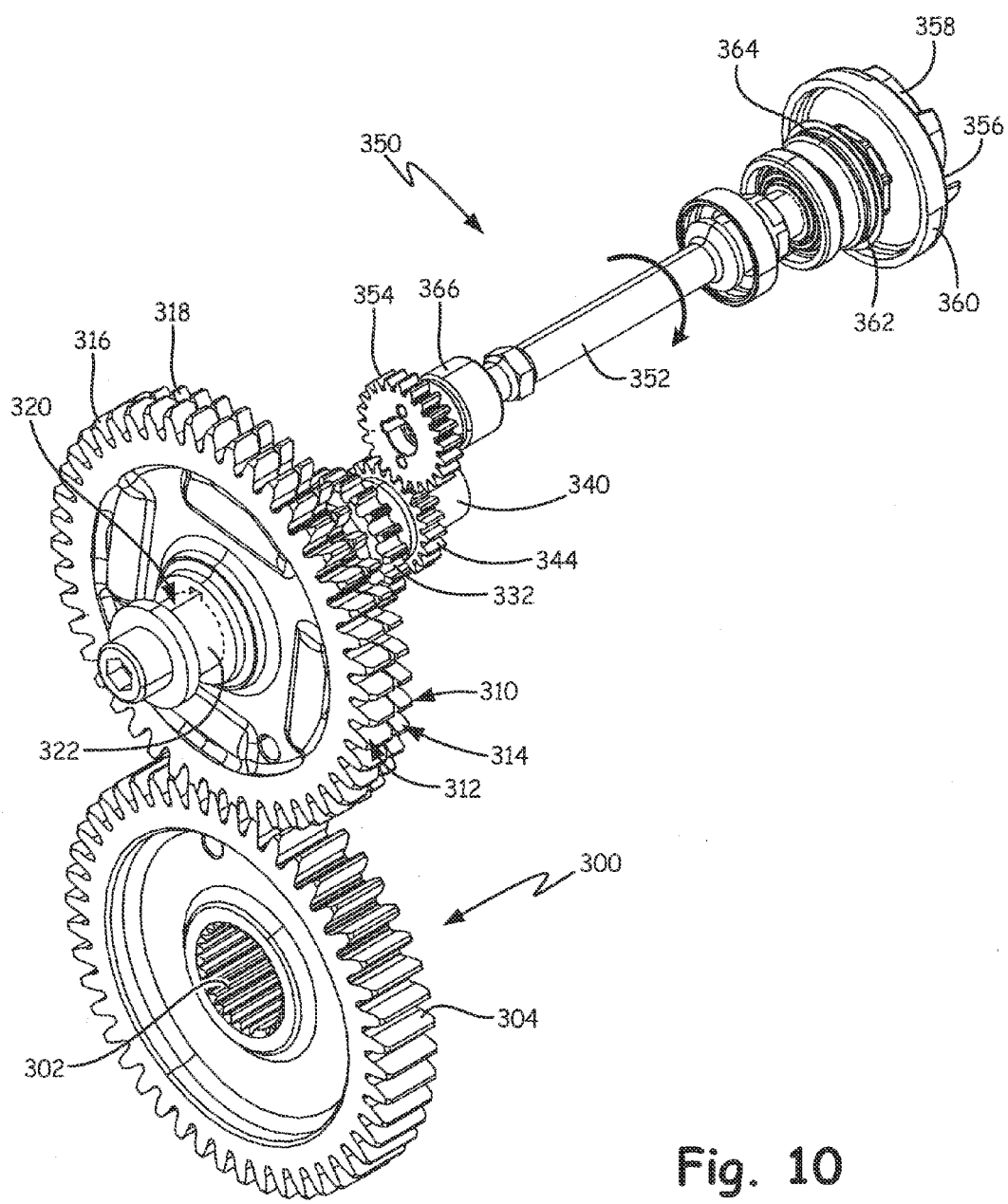
FIG. 10 shows a perspective view of the gear train for the water pump.
Figure 11A:
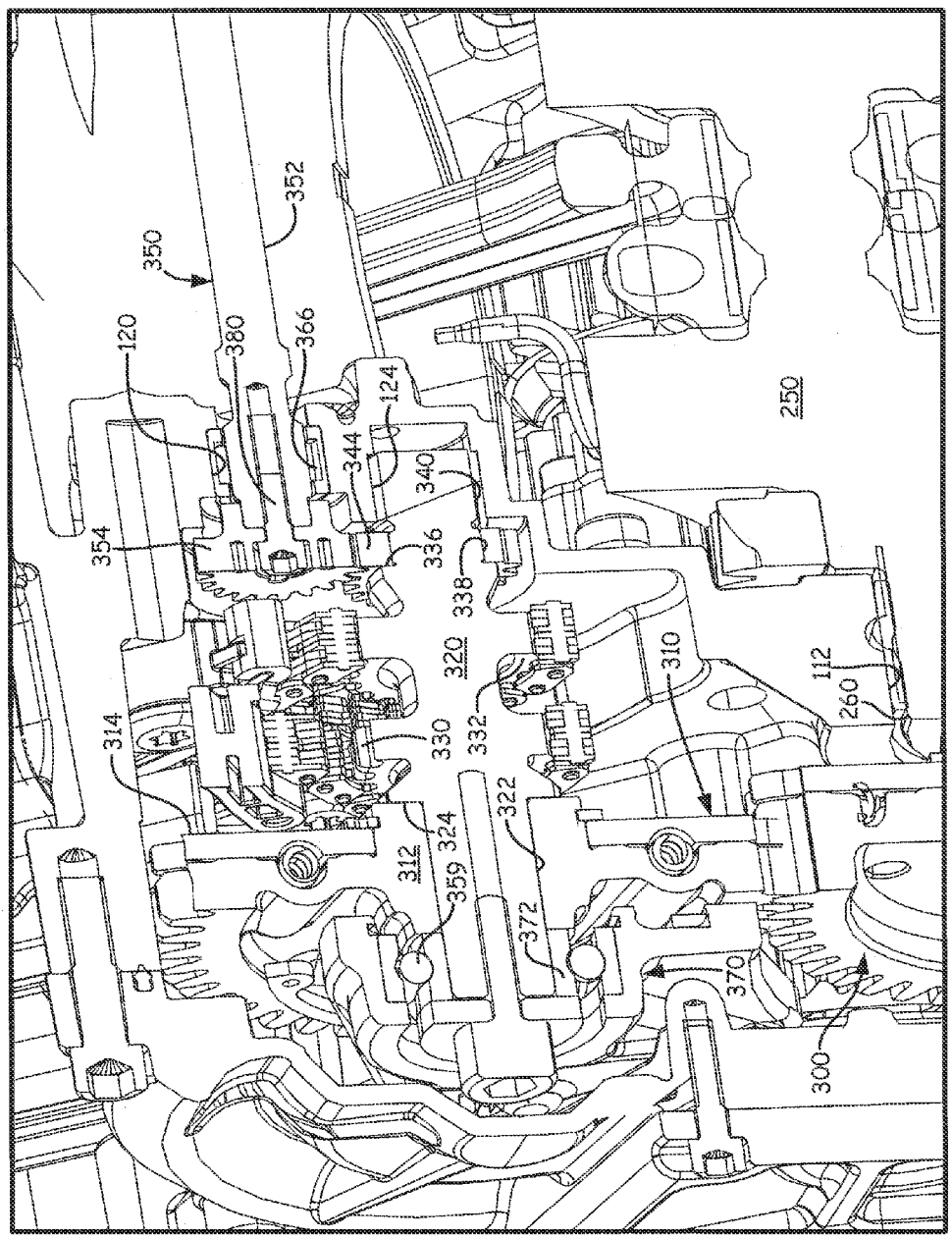
FIG. 11A shows an enlarged perspective cross-sectional view through the water pump drive shaft, through lines 11-11 of FIG. 2.
Figure 11B:
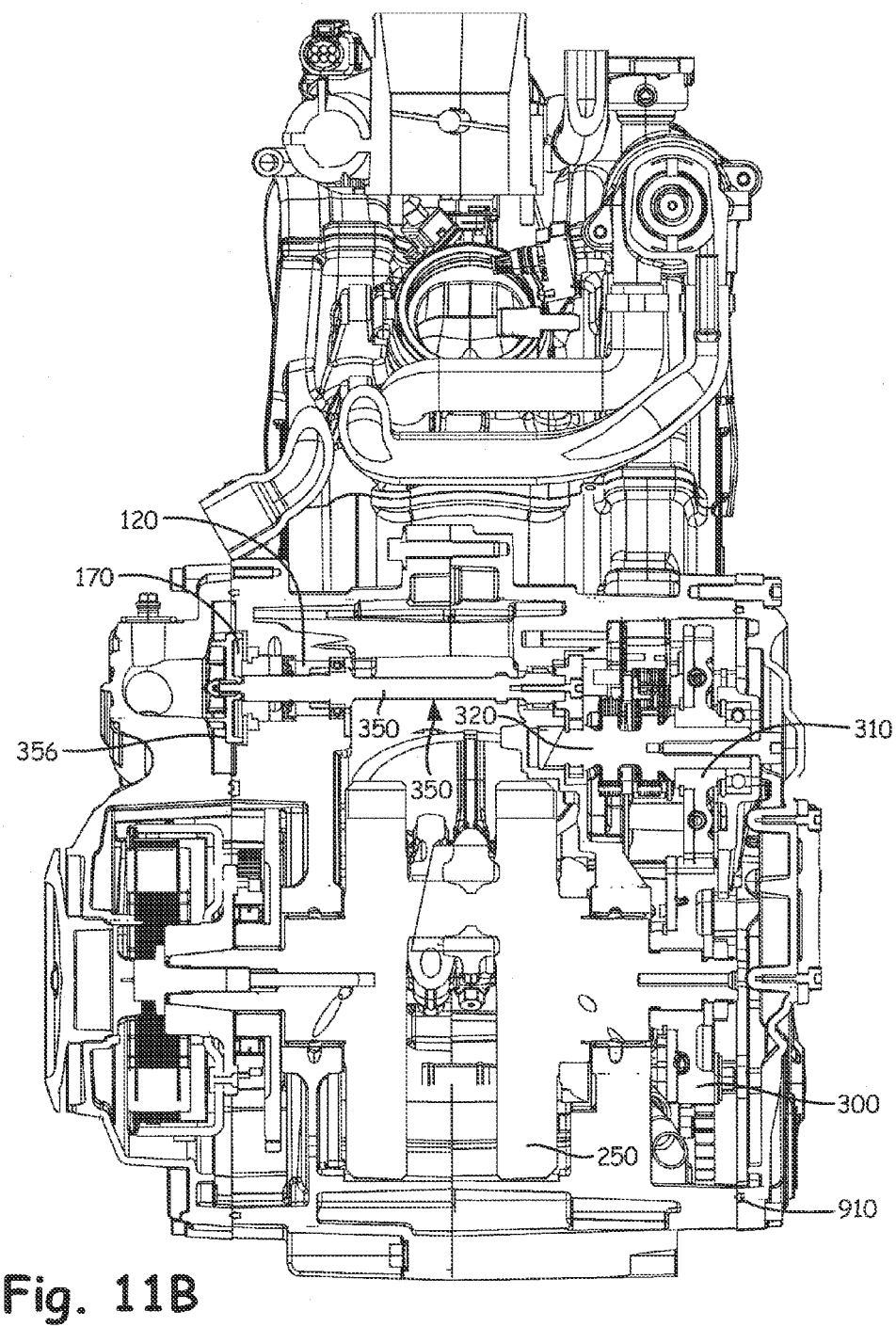
FIG. 11B is a cross sectional view through lines 11-11 of FIG. 2.

With reference now to FIGS. 10, 11A and 11B, a drive train for the water pump will be described herein. As shown best in FIG. 10, drive gear 300 is provided having internally splined coupling at 302, which corresponds with the splined exterior at 264 (FIG. 9) of crank shaft 250. Drive gear 300 further includes exterior teeth at 304, wherein the rotation of crank shaft 250 causes a driving rotation of gear 300. Driven gear 310 is entrained with drive gear 200. Gears 312, 314 include gear teeth 316, 318, respectively, which correspond in pitch with teeth 304 of drive gear 300. Driven gear 310 is a backlash gear where gears 312, 314, are torsionally spring loaded relative to each other such that teeth 316, 318 are slightly rotationally spaced away from each other. This reduces the noise and vibration of the teeth engagement.

Gear 310 is mounted to a shaft 320 having a shaft portion at 322, which terminates in a shoulder 324 (FIG. 11A) of shaft 320. Gear 310 is fixed relative to shaft portion 320 by way of a key and keyway as is known in the art. As shown in FIG. 11A, shaft 320 further includes a first gear 330 and a second gear at 332. It should be appreciated that gears 330 and 332 cooperate to drive cam chains as will be described in further detail herein. Shaft 320 further includes, at an opposite end, shoulder 336, diameter 338, and diameter 340. As shown best in FIG. 11A, a gear 344 is positioned on outer diameter portion 338 and in abutment with shoulder 336. Gear 344 is also fixed relative to shaft 320 by way of a key and keyway as described above. Shaft 320 is rotatably held by two bearings, a ball bearing 372 positioned adjacent a first side (see FIG. 11A) and a plain bearing (not shown) but positioned between surfaces 124, 340 in FIG. 11A).

With reference now to FIG. 10, a water pump impeller drive is shown at 350. Drive 350 includes a shaft 352 having a driven gear 354 on one end thereof entrained with drive gear 344. The pump impeller 356 is mounted to an opposite end of the shaft 352 and includes vanes 358. Impeller 356 includes an outer diameter portion 360. A seal 362 is provided having sealing ribs at 364.

With reference now to FIG. 11A, crankshaft 250 is shown coupled to drive gear 300, which is in turn drivingly coupled to gear 310. Gear 310 is coupled to shaft 320. Shaft 320 is shown with diameter portion 340 mounted in aperture 124 (see also FIG. 5) and with a bearing cap 370 coupling the opposite end 322 with a ball bearing 372, having balls 359. Bearing cap 370 is coupled directly to block 12. FIG. 11A also shows gears 344, 354 in meshing engagement and with gear 354 coupled to shaft 352 by way of fastener 380. Bearing 366 is positioned in aperture 120 and cooperates with shaft 352 for rotation of shaft 352. The direction of shaft rotation is shown by the arrow in FIG. 10.

It should be appreciated that this positions impeller 356 in position within water pump housing (FIG. 8, 11B) with vanes 358 positioned proximate convolutes 180a, 180b. FIG. 12 shows the linkage between crank shaft 250 and water pump impeller 356 and further shows a water pump cover 400 having a mating face at 402, which can mount flush with planar surface 98 (FIG. 8). Water pump cover 400 may mount to water pump housing 170, for example, by way of fasteners through corresponding apertures 404a, 406a; 404b, 406b; and 404c, 406c. Housing 400 further includes an intake coupling at 410 to provide water into housing 170. Cover also includes an elongate portion 412a to enclose convolute 180a and elongate portion 412b to enclose convolute 180b.

Thus, it should be appreciated that water pump 46 and, in particular, water pump impeller 356 is directly coupled to crank shaft 250, whereby rotation of crankshaft 250 causes movement of water through intake coupling 410 through water pump 46 delivering water at upper surfaces 198a, 190b (FIG. 8) of engine block 12 through apertures 188a, 188b. With reference now to FIGS. 13-16C, cylinder 14 will be described in greater detail.

With reference now to FIGS. 13-16C, cylinder 14 will be described in greater detail. It should also be noted that the description relates to cylinder 14, which is the cylinder for the front cylinder assembly 8, however, it should also be appreciated that cylinder 24 is substantially the same as that described with respect to cylinder 14; with the exception that cylinder 24 is in a mirror-image relationship.

Figure 13:
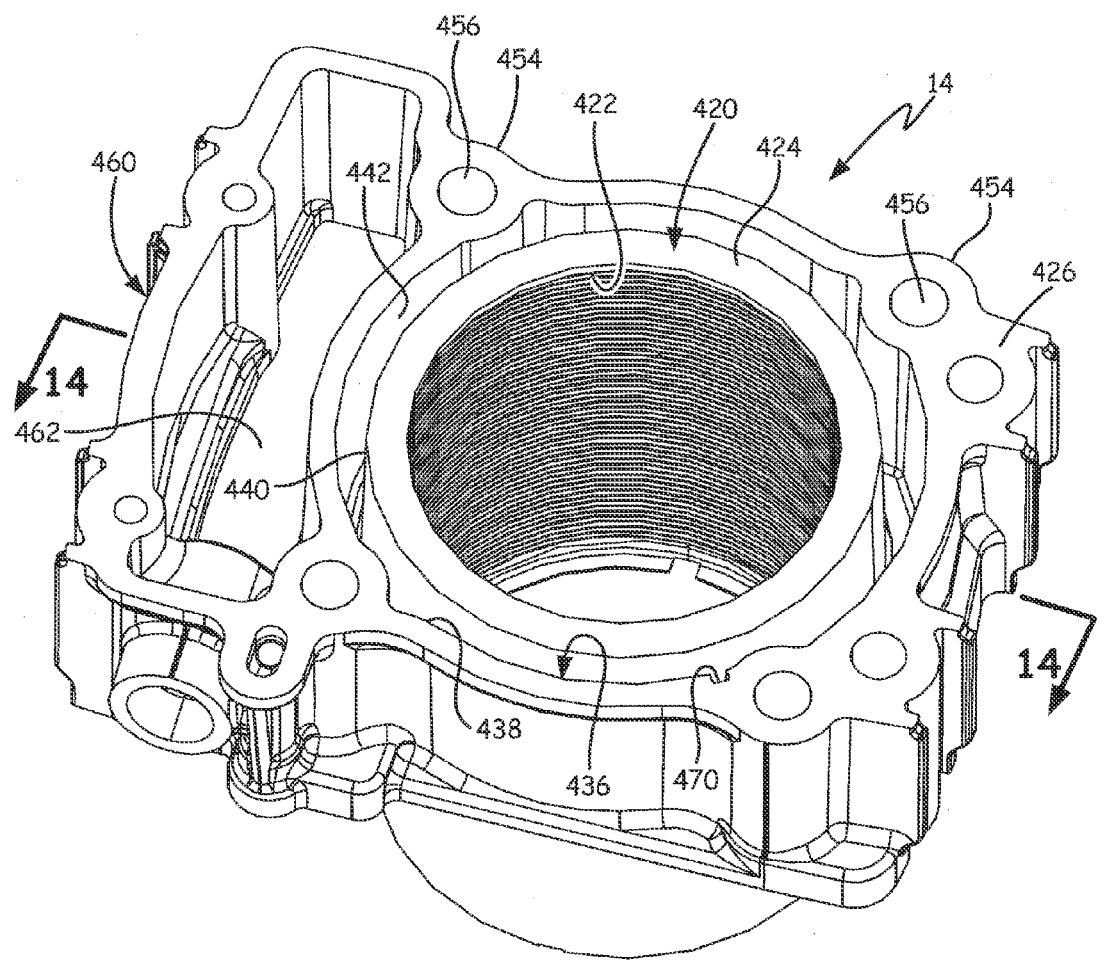
FIG. 13 is an upper perspective view of the cylinder of the present disclosure.
Figure 14:
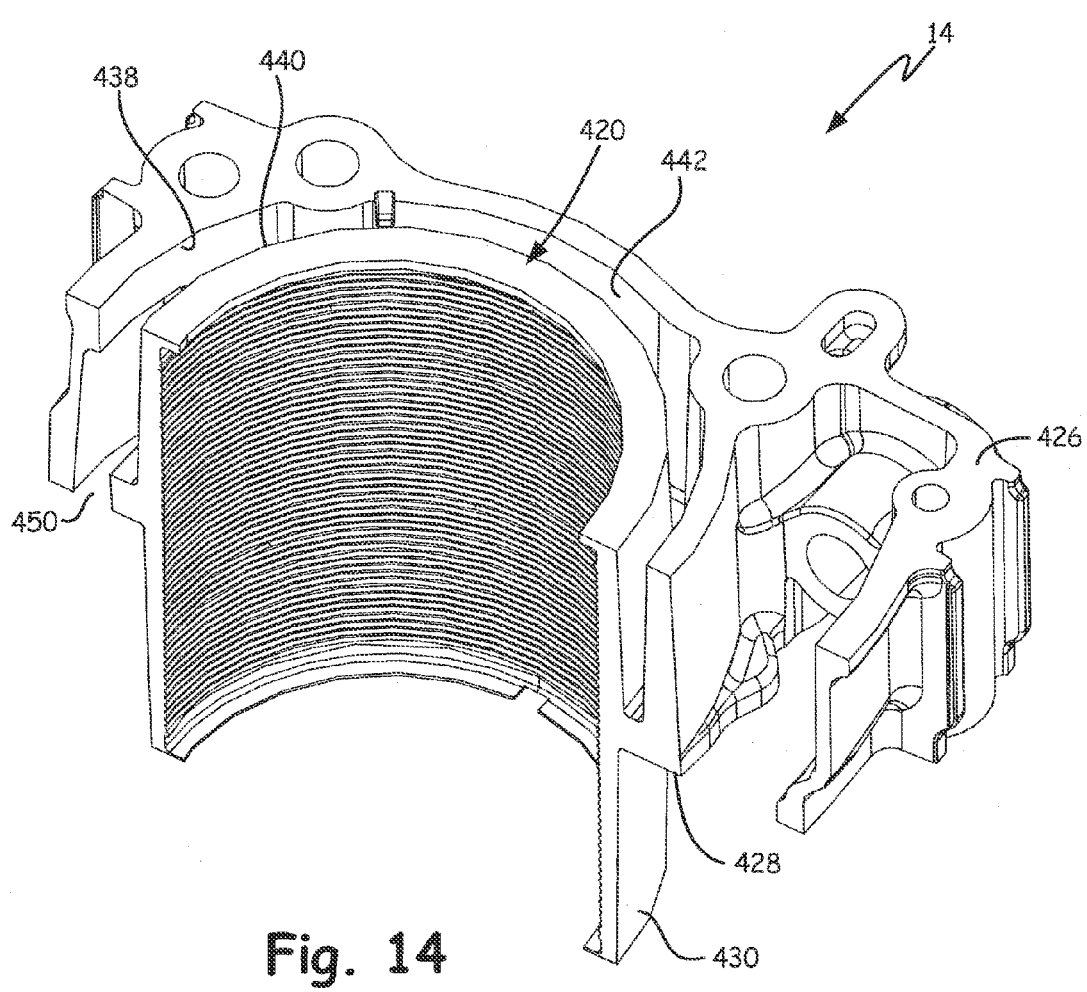
FIG. 14 is a cross-sectional view through lines 14-14 of FIG. 13.
Figure 15:
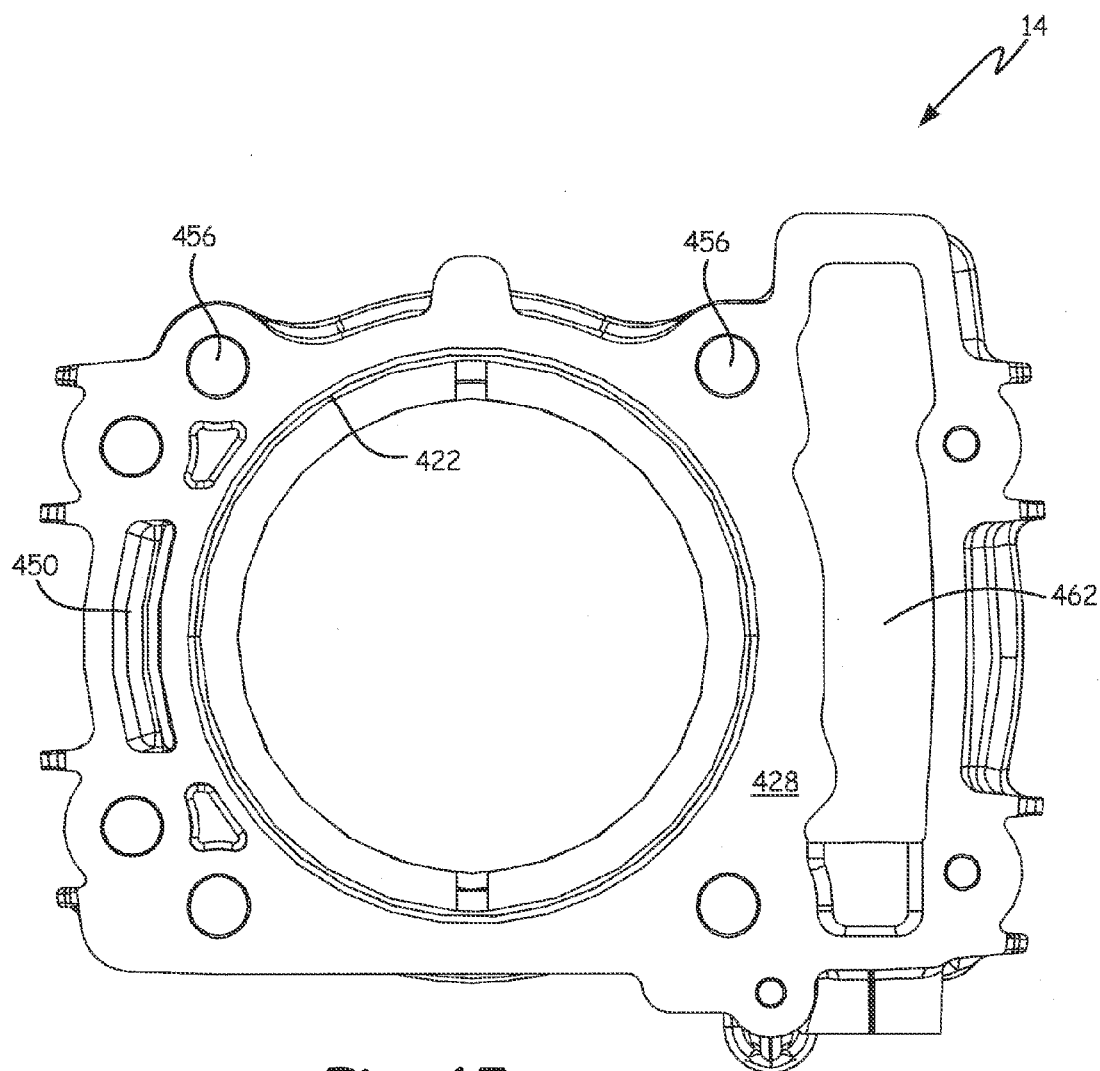
FIG. 15 is a lower plane view of the cylinder of FIG. 13.

As shown in FIG. 13, cylinder 14 includes a central cylinder portion 420 having an internal diameter portion at 422, which as should be appreciated receives a piston of the engine portion of the power train. Cylinder portion 422 includes an upper surface at 424, which is planar with the remaining upper surface portion 426 of cylinder 14. As shown in FIGS. 14 and 15, a lower planar surface 428 is defined in a parallel manner with upper planar surface 426. It should also be noted that cylinder portion 420 has a lower portion 430 extending below lower planar surface 428. It should also be appreciated that lower cylinder portion 430 extends below upper surface 190a (FIG. 4) and into opening 200a (FIG. 4) and into the crankcase of block 12.

A wall portion 436 (FIG. 13) encircles cylinder portion 420 and defines an internal circular surface at 438 spaced away from an internal surface 440 of cylindrical portion 420 defining a channel 442 therebetween. It should be appreciated that channel 442 is defined to receive cooling water such that cooling water circulates around cylinder portion 420 and cools cylinder portion 420 from heat caused by the combustion. In that respect, a channel or opening 450 is defined between cylinder portion 420 and outer wall 436 as shown best in FIGS. 14 and 15. It should be appreciated that opening 450 corresponds with passageway 188a (FIG. 3) when cylinder 14 is positioned on surface 190a of block 12. Outer wall 436 further includes a plurality of bosses, such as 454 providing apertures at 456, which as should be appreciated, receives a stud placed in a top of block 12, as is known in the art.

Cylinder 14 also includes an enclosed volume portion 460 providing an internal generally rectangular internal volume at 462, which corresponds with opening 210a (FIG. 3) when cylinder 14 is positioned on block 12. Volume portion 462 allows the passage of cam chains upwardly to overhead cams as described herein.

Figure 17:
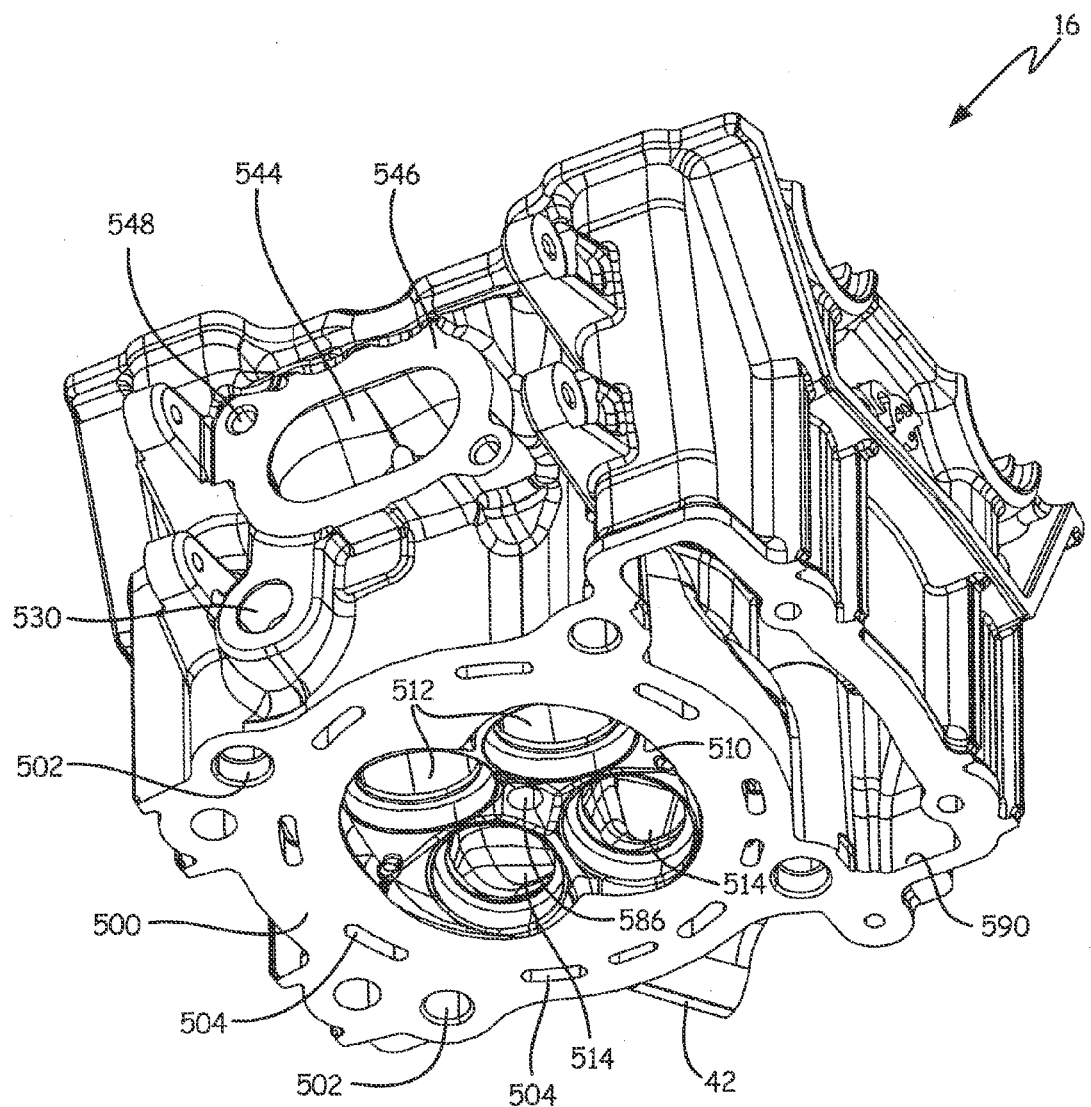
FIG. 17 is a lower perspective view of the head of the present disclosure.
Figure 18:
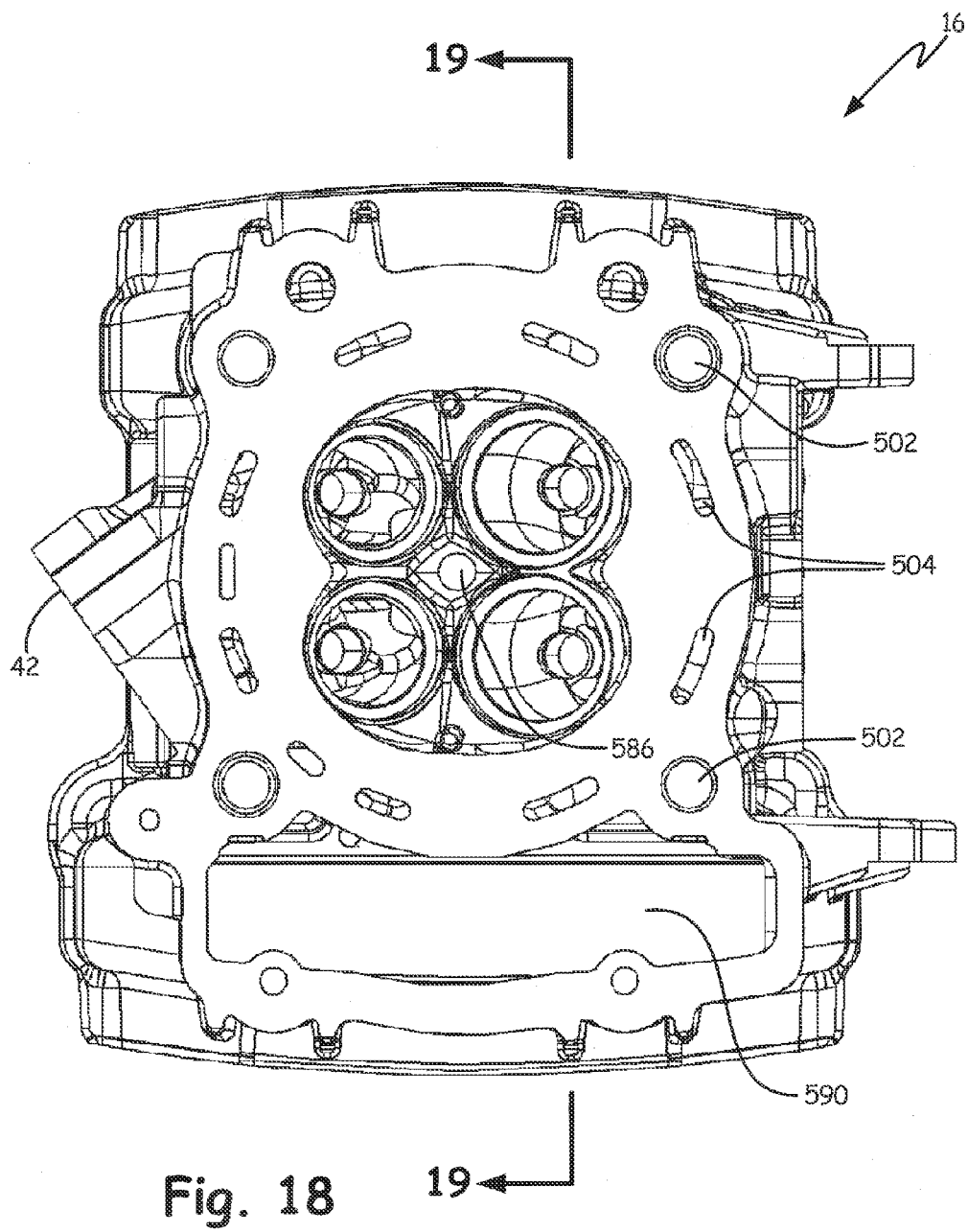
FIG. 18 is a lower plan view of the head of FIG. 17.
Figure 19:
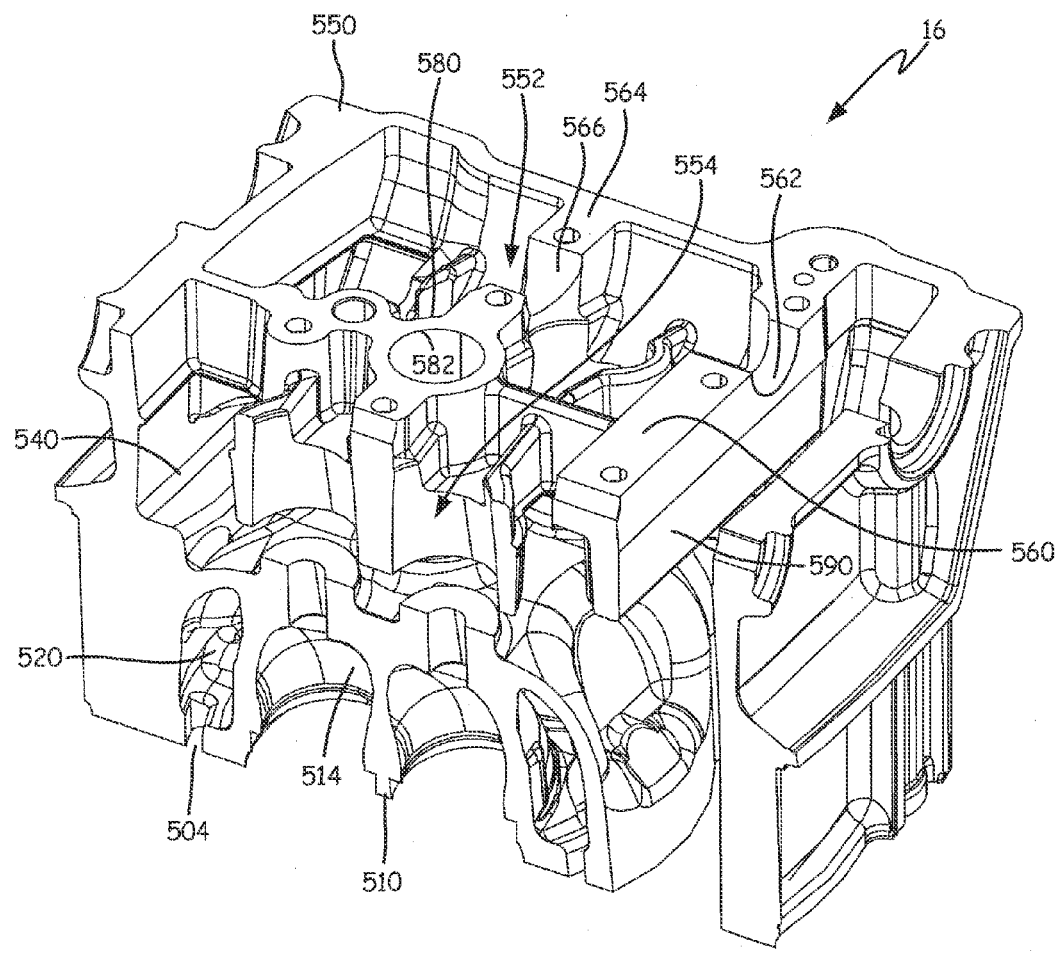
FIG. 19 is a cross-sectional view through lines 18-18 of FIG. 18.

Cylinder 14 is designed to ensure adequate cooling around the cylinder. As shown in FIG. 13, a slot 470 is provided on internal surface 438 adjacent to upper surface 426. As shown in FIGS. 16A and 16B, an insert 480 is provided having a tapered body portion 482 having an internal arcuate surface at 484 having a tab portion at 486. Outer surface of insert 480 includes slot portions at 490 interrupting outer surface 492. With reference to FIG. 16C, insert 480 is shown inserted with tab 486 positioned in slot 470 and positioned over boss 454. As shown, insert 480 is positioned adjacent to water channel 450 and extends across internal water channel 442. Slots 490 allow some controlled passage of water through the insert, however, insert 480 creates a damming effect, causing water to circulate and fill the entire void or channel 442 to ensure proper cooling of the entire cylinder 420. With reference now to FIGS. 17-19, head 16 will be described in greater detail.

With reference first to FIG. 17, head 16 includes a lower planar surface 500 having a plurality of mounting apertures at 502, which correspond in location to apertures 456 (FIG. 13) in order to position head in position relative to cylinder 14. Head 16 further includes a plurality of water receiving slots 504, which are positioned in a diametrical pattern, which matches the pattern of water channel 442 (FIG. 13) on the upper side of cylinder 14. Thus it should be appreciated that water flowing upward through cylinder 14, and through channel 442, flows into channels 504 to cool combustion chamber 510 of head 16. It should also be appreciated that combustion chamber 510 includes two openings 512 for intake valves and two openings 514 for exhaust valves.

Head 16 is a cast item including a plurality of internal chambers. First, and with respect to FIG. 19, an internal water chamber 520 is defined on an outside of combustion chamber 510 which communicates with water outlet 530 (FIG. 17). Thus, water moving through cylinder 14 into head 16 travels through channels 504 into chamber 520 and exits at 530. It should also be appreciated that water outlet 530 exits into the "V" of the engine and a corresponding opening on head 26 will also open into the "V" of the engine such that each of the outlets face the opposing cylinder assembly.

As shown in FIG. 17, an internal air chamber is defined, which communicates with intake ports, which in turn communicate with valve openings 512. Air intake port is shown at 544, which communicates with internal chamber 540 (FIG. 19) and includes a flange 546 and mounting apertures at 548. Thus air traveling into head 16 travels through air intake port 544 through to chamber 540 and into combustion chamber 510 through valve openings 512. In a like manner, exhaust valve openings 514 communicate with an internal exhaust chamber (not shown), which communicates with exhaust port 42 as shown in FIG. 18.

With reference again to FIGS. 19 and 20, head 16 includes an upper planar surface at 550, and further defines cam receiving areas; area 552 for an exhaust cam and area 554 for an intake cam. In that regard, head 16 includes transverse wall 560 having a semi-cylindrical receiving opening at 562 and transverse wall 564 having a semi-cylindrical opening at 566. As shown best in FIG. 20, transverse wall 560 further includes a semi-cylindrical opening at 572 and transverse wall 564 includes a semi-cylindrical opening at 574. Thus, it should be appreciated that cam shafts lie across the respective valve openings, 512, 514, and lay in their corresponding receiving areas 552, 554, as further described herein.

As shown in FIG. 19, head 16 also includes a central tubular portion 580, which may be cylindrical having an opening at 582, which may also be cylindrical. It should be appreciated that cylindrical opening 582 provides access to a spark plug receiving opening 586 (FIG. 17), which in turn communicates with combustion chamber 510. Head 16 further includes passageway 590 for a cam chain, which passes through upper face 560 and lower face 500. It should be appreciated that passageway 590 corresponds with passageway 462 (FIG. 13) and passageway 210a (FIG. 4). Pairs of apertures 594a, 594b flank semi-cylindrical openings 562, 566; and apertures 596a, 596b flank semi-cylindrical openings 572, 574, respectively, for retention of cams in their corresponding receiving areas 552, 554 as described herein.

While only a single head is shown at 16, it should be understood that a family of heads is contemplated, each having a variety of different diameters 422, to vary the displacement.

Figure 20:
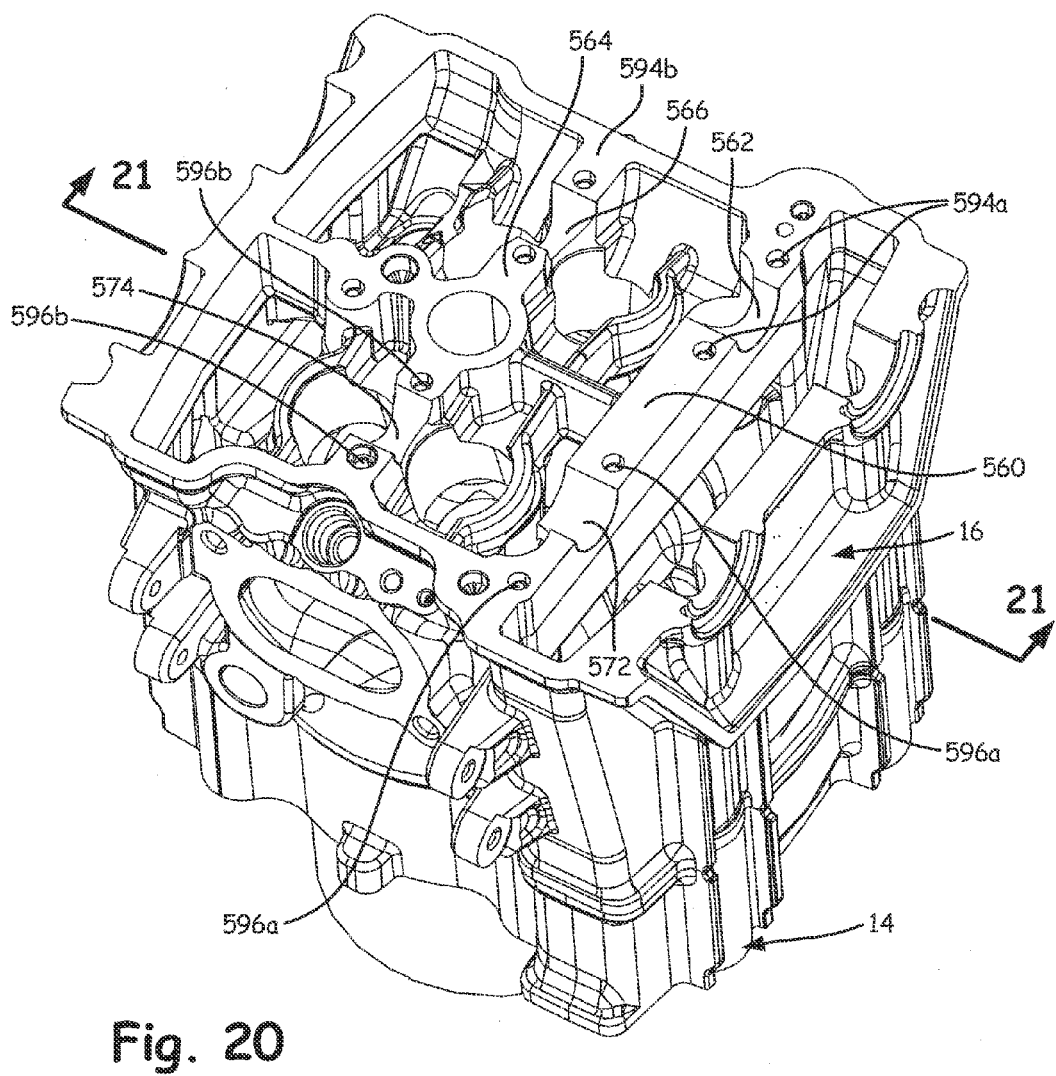
FIG. 20 is an upper perspective view showing the head in place on a corresponding cylinder.
Figure 21:
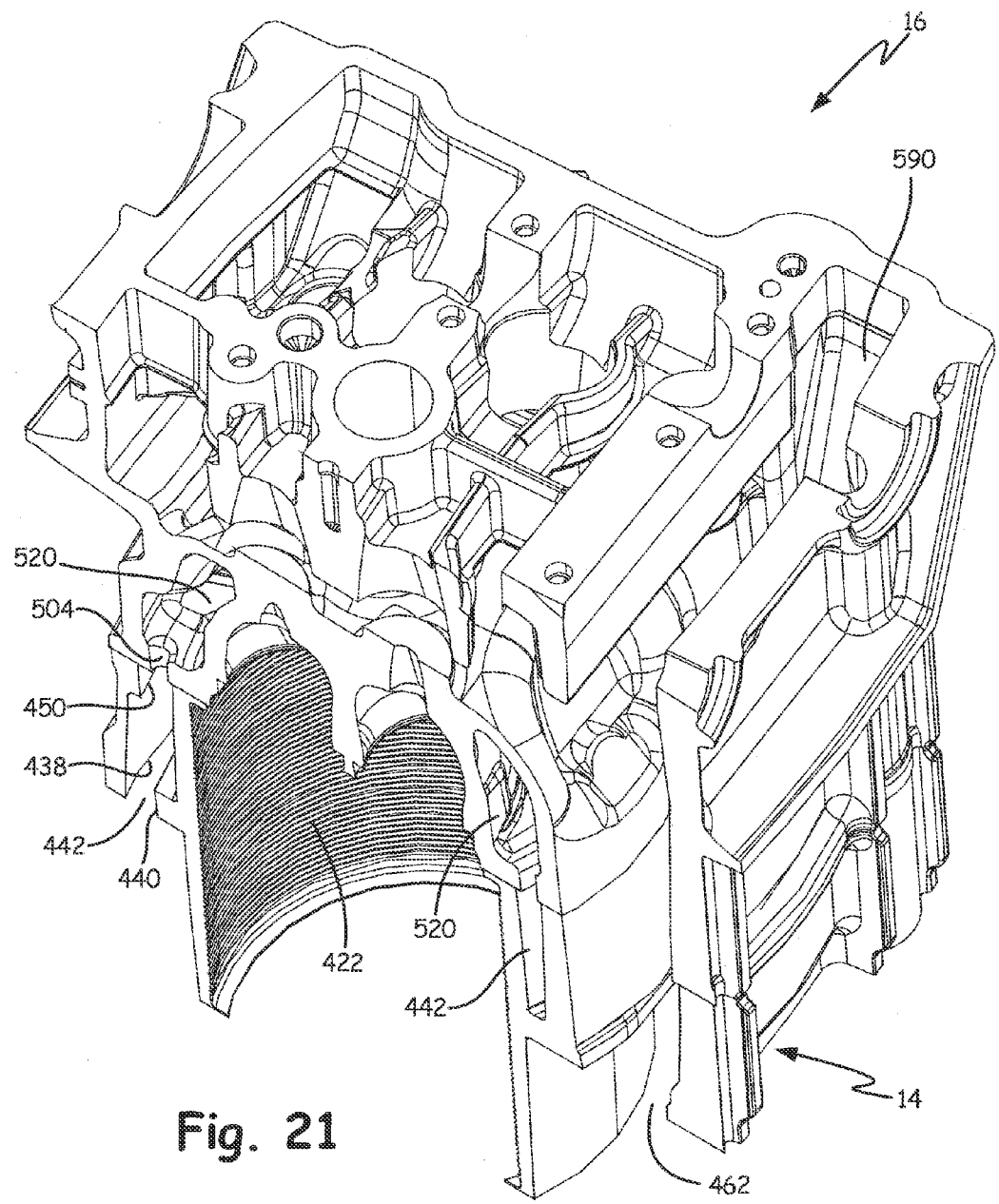
FIG. 21 is a cross-sectional view taken through lines 21-21 of FIG. 20.
Figure 22:
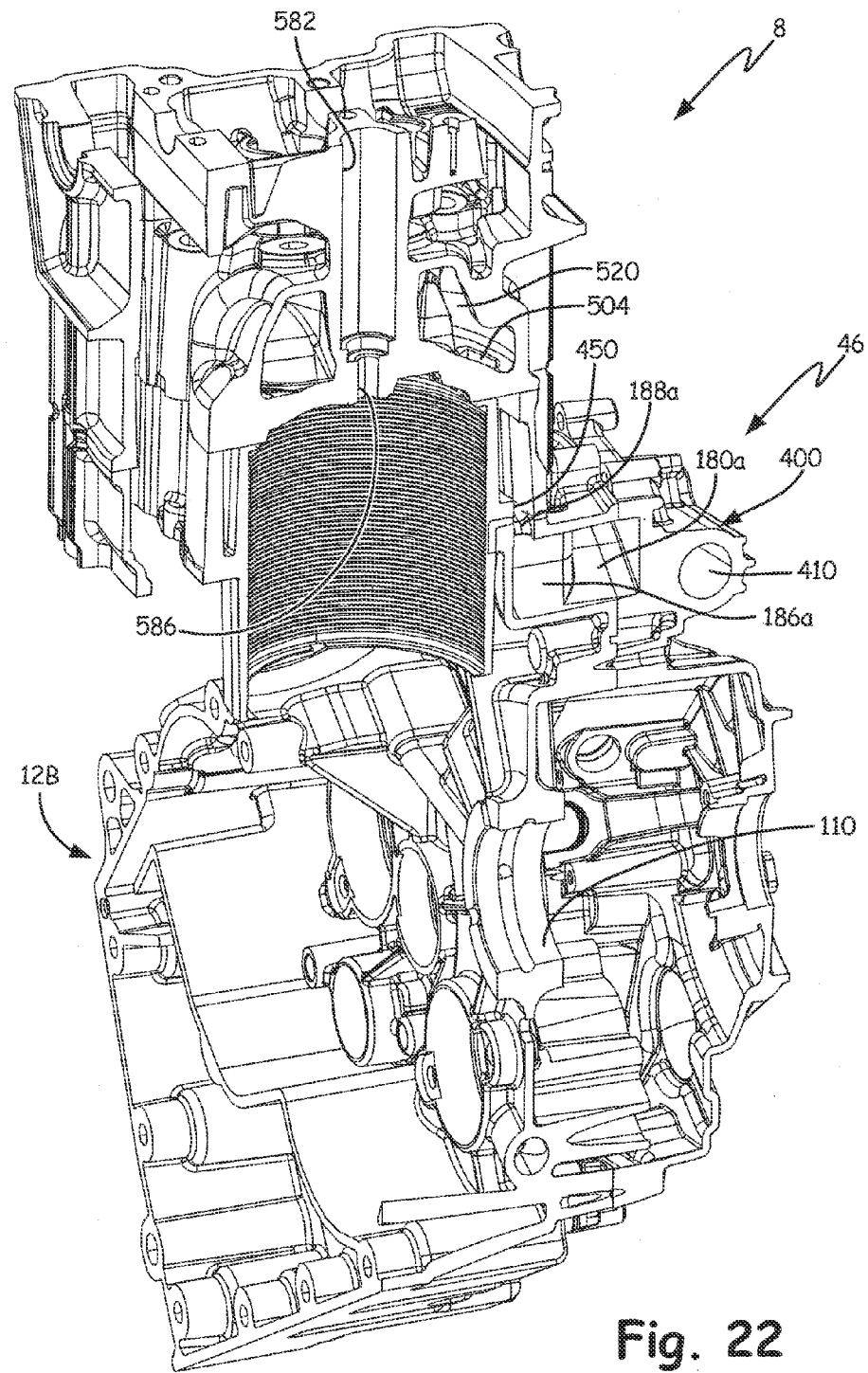
FIG. 22 is a cross-sectional view through the center of front center assembly and the crank shaft bearing portion, viewed rearwardly.

With reference now to FIGS. 20 and 21, the alignment of cylinder 14 and head 16 will be described. As shown best in FIG. 21, head 16 is shown positioned over cylinder 14, such that cam passageways 462 and 590 align providing a consistent vertical passageway; furthermore, water channel 442 in the top of cylinder 14 is shown aligned with water chamber 520 and with receiving openings 504. As mentioned previously, coolant water travels upwardly through the block 12 through passageway 442 of cylinder 14 upwardly through openings 504 into chamber 520 to cool both the cylinder and combustion chamber 510 and exit through port 530 (FIG. 20). Finally, with respect to FIG. 22, the intersection of convolute 180a and upper passageway 188a of block 12 is shown in combination with the communication of passageways 450, 504, and chamber 520.

Figure 23:
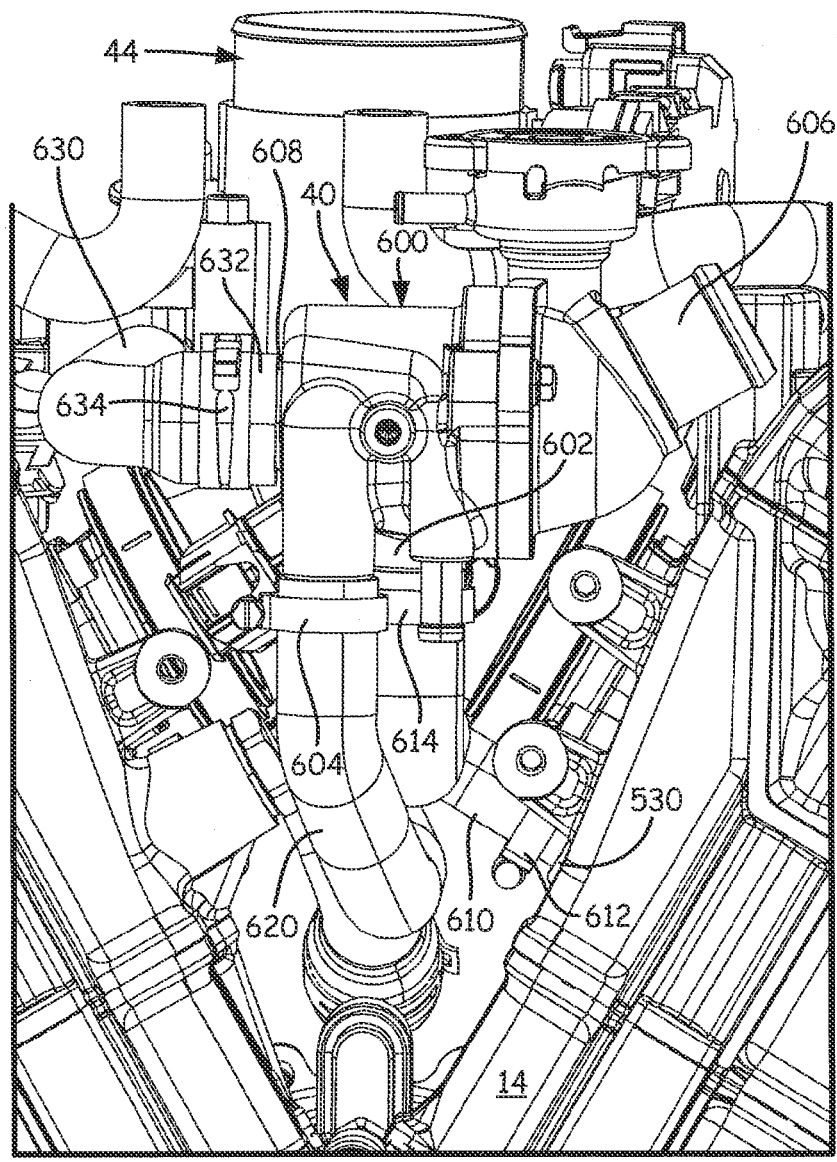
FIG. 23 is an enlarged view of the thermostat assembly from a right-hand side view.

The completion of the water cooling system will now be described in relation to the thermostat assembly 40. As shown in FIG. 23, thermostat 40 sits in the "V" of the engine portion 4 intermediate the front cylinder assembly 8 and the rear cylinder assembly 10. Thermostat assembly 40 includes a thermostat 600 having a first input at 602 and a second input at 604. Thermostat 600 includes two outlets; one at 606 and a second at 608. Inlet 602 communicates with water outlet port 530 (see also FIG. 17) by way of a hose 610. It should be appreciated that hose 610 is fixed in place by way of clamps such as 612, 614. A second hose 620 is provided with a first end coupled to inlet 604 and a second end coupled to a corresponding water outlet port 530 of cylinder assembly 10. Thus, coolant water traveling up through cylinder assemblies 8 and 10 as described above in relation to FIG. 22, exits through corresponding water ports 530 in head 16 and into hoses 610, 620, and flows into thermostat 600 through ports 602, 604.

Thus, if the coolant water is still cool, as in the case of a recently started engine, thermostat will remain closed and the coolant water will exit through port 608 into hose 630. Hose 630 has a first end 632 coupled to port 608 by way of clamp 634, and a second end 636 coupled to a return port (FIG. 2) by way of a coupling (not shown). Coupling 644 returns the coolant water directly to water pump 46 to recirculate the water through the convolutes and back through the front and rear cylinder assemblies 8, 10, as previously described. When the engine heats to a position where the thermostat is opened (given the preset temperature for thermostat 600), water flows through exit port 606, and will proceed toward the front of the motorcycle to a radiator. It should be appreciated that the radiator will have an inlet port coupled to port 606 and an outlet port coupled to port 410 (FIG. 2) to provide a closed system for the coolant water. An exemplary motorcycle for use with power train 2 is described more fully in our co-pending patent application Ser. No. 61/799,880 filed Mar. 15, 2013.

Figure 24:
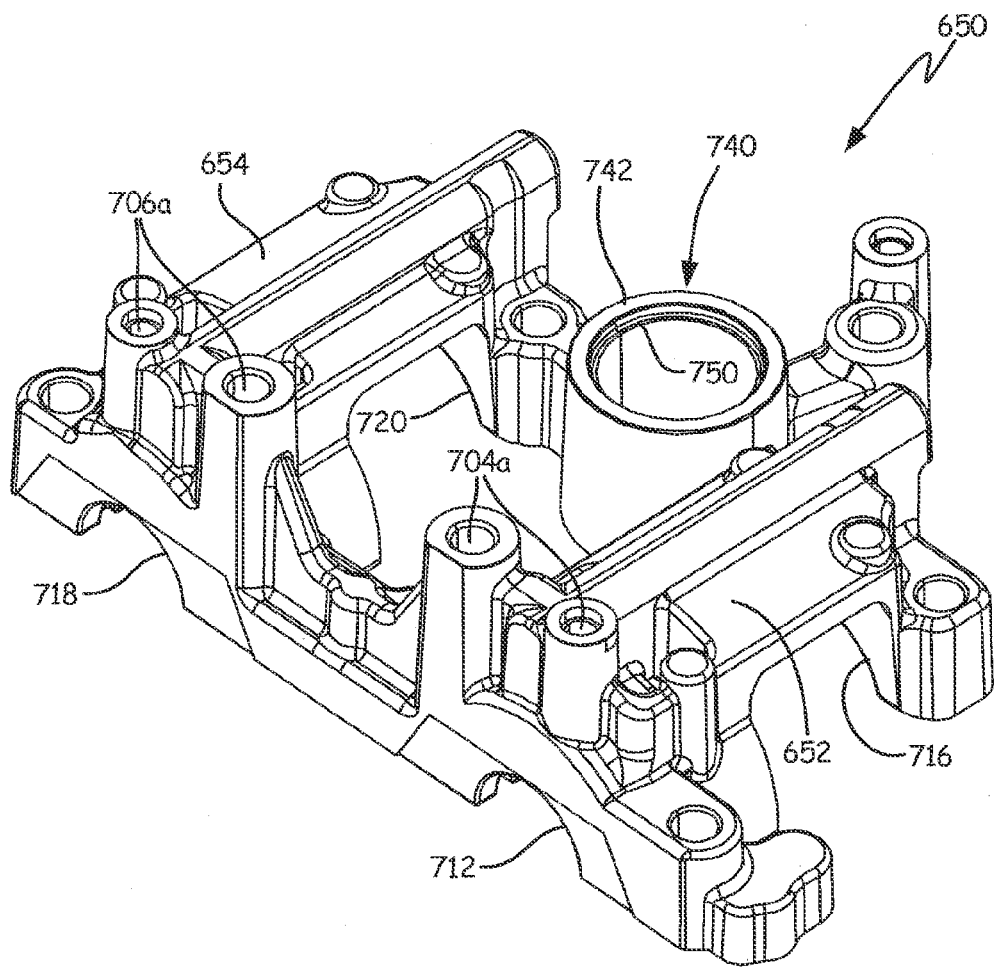
FIG. 24 is an upper perspective view of a cam carrier of the present disclosure.
Figure 25:
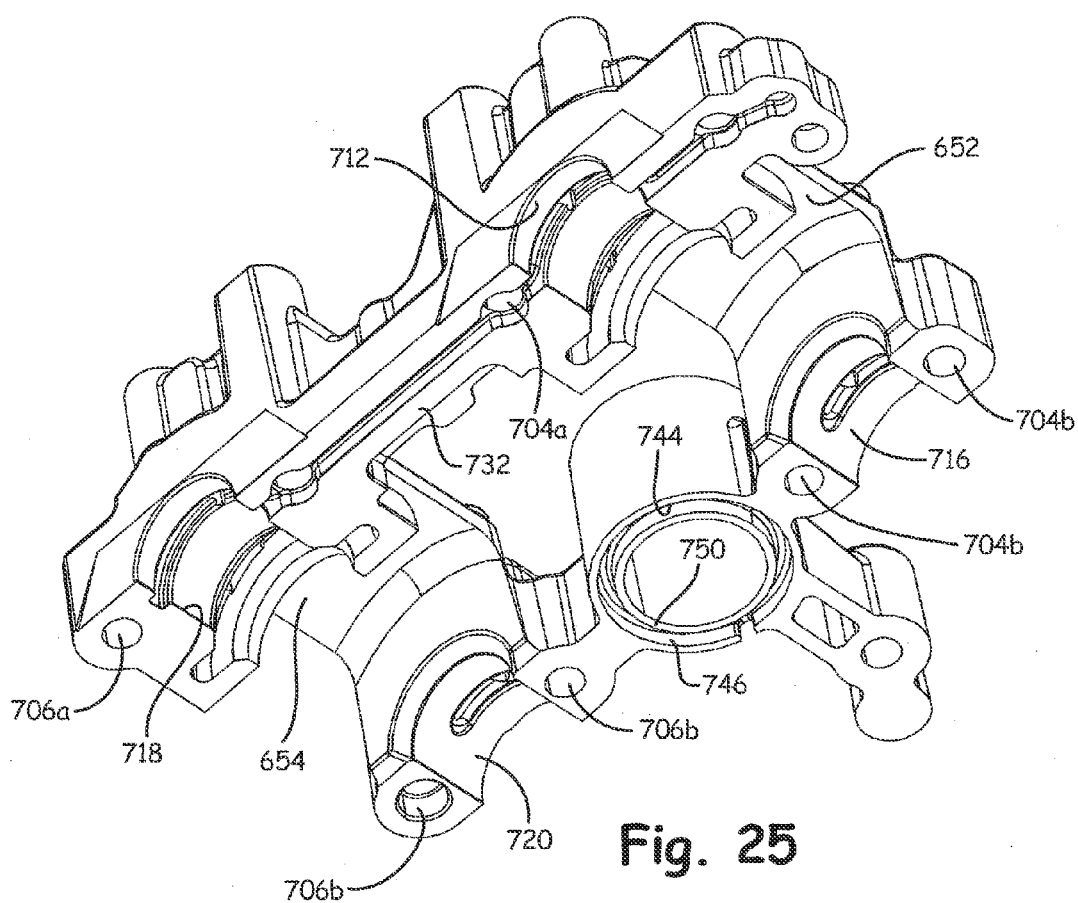
FIG. 25 is an underside perspective view of the cam carrier of FIG. 23.

With reference now to FIGS. 24 and 25, a cam carrier or carrier is shown at 650 having a body portion 652 for overlying cam receiving area 552 and a body portion 654 for overlying cam receiving area 554. Body portion 652 includes apertures 704a for alignment with apertures 594a; apertures 704b for alignment with apertures 594b; apertures 706a for alignment with apertures 596a; and apertures 706b for alignment with apertures 596b. As shown best in FIG. 24, cam carrier 650 also includes semi-cylindrical recess 712, which corresponds with semi-cylindrical recess 562; and a semi-cylindrical recess 716, which corresponds to recess 566 (FIG. 20) on head 16. Body portion 654 includes a semi-cylindrical recess 718 corresponding to recess 572 and recess 720 corresponding to recess 574 (FIG. 20). As shown in FIG. 24, a lower surface of cam carrier 650 also includes a planar surface 732, which can fit flushly with top surface 550 (FIG. 19) of head 16.

As shown in FIG. 24, cam carrier 650 further includes a central tubular portion 740 which may be cylindrical, having an upper surface at 742 and a lower surface at 744. As shown in FIG. 25, lower surface 744 includes an undercut portion 746, defining an annular recess, for recessing a seal (not shown). Lower surface 744 is profiled to cooperate with cylindrical portion 580 (FIG. 19) and cylindrical portion 740 further includes an inner diameter at 750, which is substantially the same as inner diameter 582 (FIG. 19) of cylindrical portion 580. Thus, cams may be positioned in the receiving areas 552 and 554 with the cam gear positioned in area 590 (FIG. 19). Cam carrier 650 may then be received over the cams and coupled to the head to retain the cams in position in their respective areas 552, 554 and above intake and exhaust valves.

Figure 26:
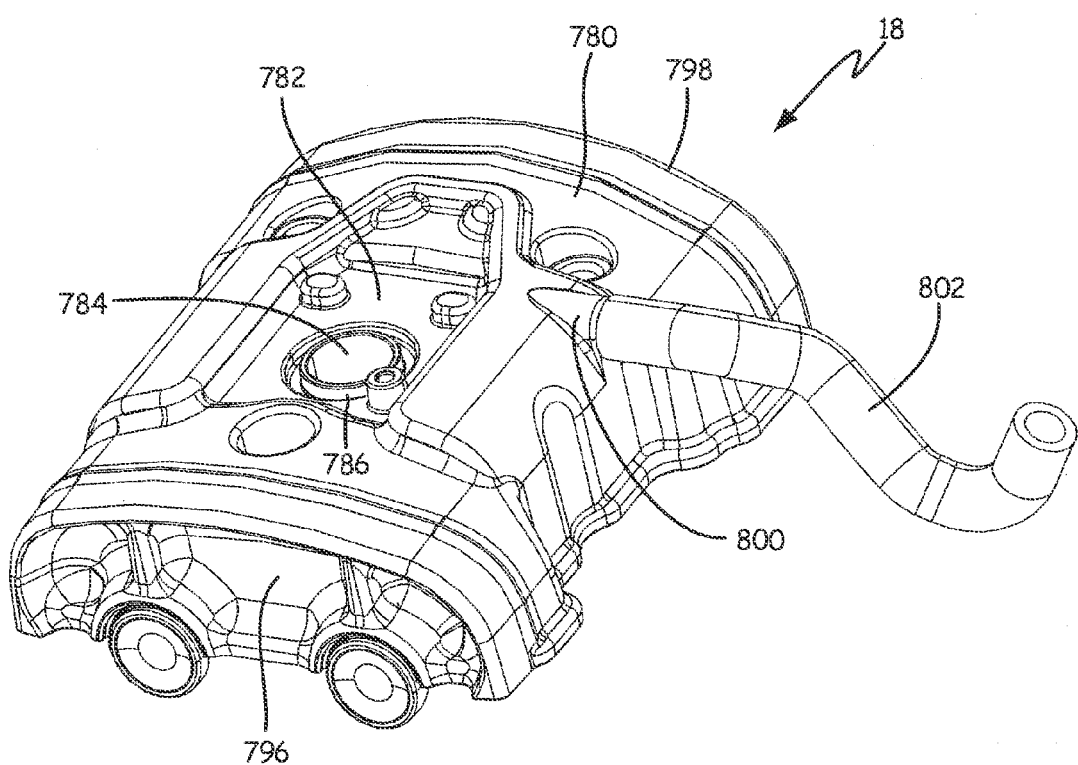
FIG. 26 is an upper perspective view of a valve cover for the present disclosure.
Figure 27:
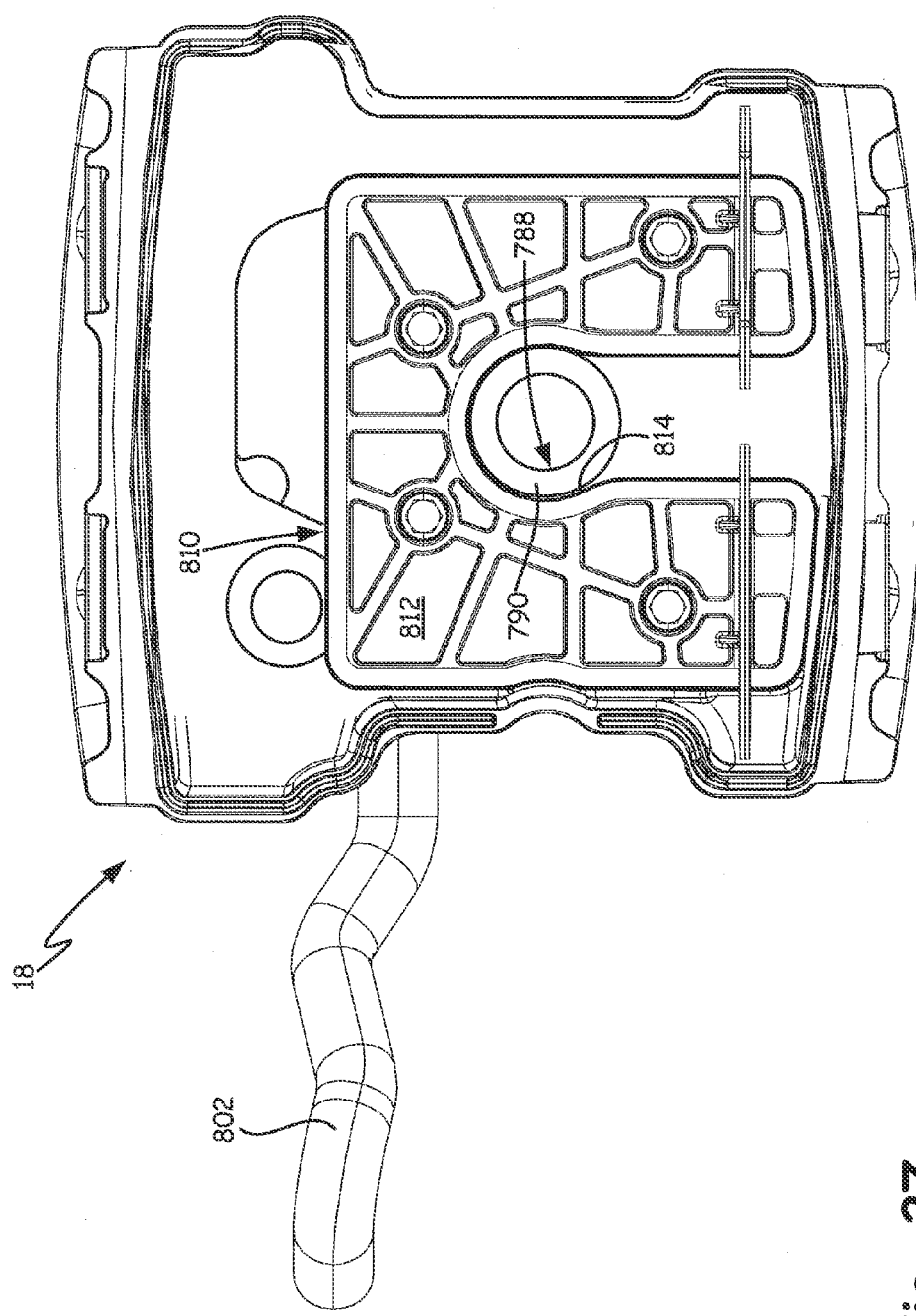
FIG. 27 is an underside view of the valve cover of FIG. 25.
Figure 28:
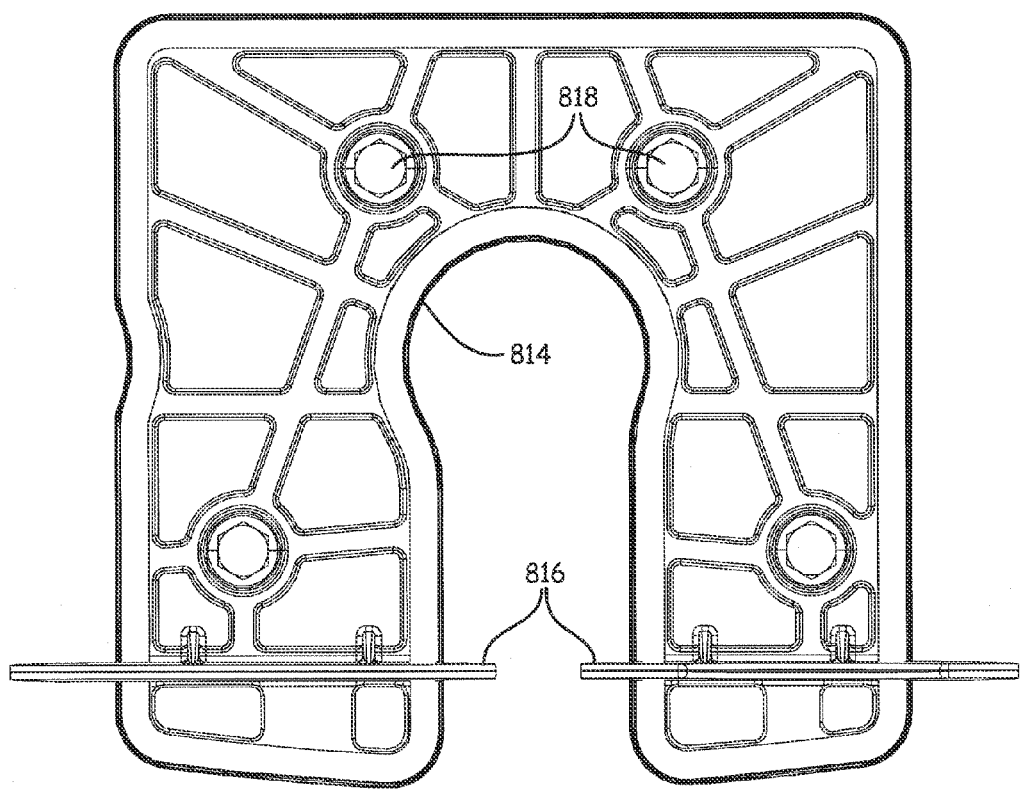
FIG. 28 is an underside view of the baffle plate of the valve cover of FIG. 24.

With respect now to FIG. 26, valve cover 18 is shown having a body portion 780 having a central area 782 having an opening at 784 defined by a cylindrical member 786. As shown best in FIG. 27, cylindrical member 786 has a seal 788 having an inner channel 790. Seal 788 could be a discreet seal or could be integrally molded with cylindrical portion 786. It should be appreciated that seal 786, and more particularly channel 790, is received over upper end 742 (FIG. 25) of cylindrical portion 740 of cam carrier 650. As shown, body portion 780 is generally curved along its top side having end walls 796 and 798. An exit port is positioned at 800 coupled to a breather tube 802 as will be described herein. An underside of valve cover 18 includes a baffle plate 810 defined by a plate portion 812. Plate portion 812 includes a circular opening 814 receivable over tubular portion 786. Baffle plate 812 further includes upright baffles 816 and fasteners 818 couple baffles plate 810 within valve cover 18. Hose 802 is then connected to an air box of a motorcycle to recycle unspent gases that leak through the combustion chamber, back to the air box and air cleaner for recycling of the unspent gasses.

Figure 30:
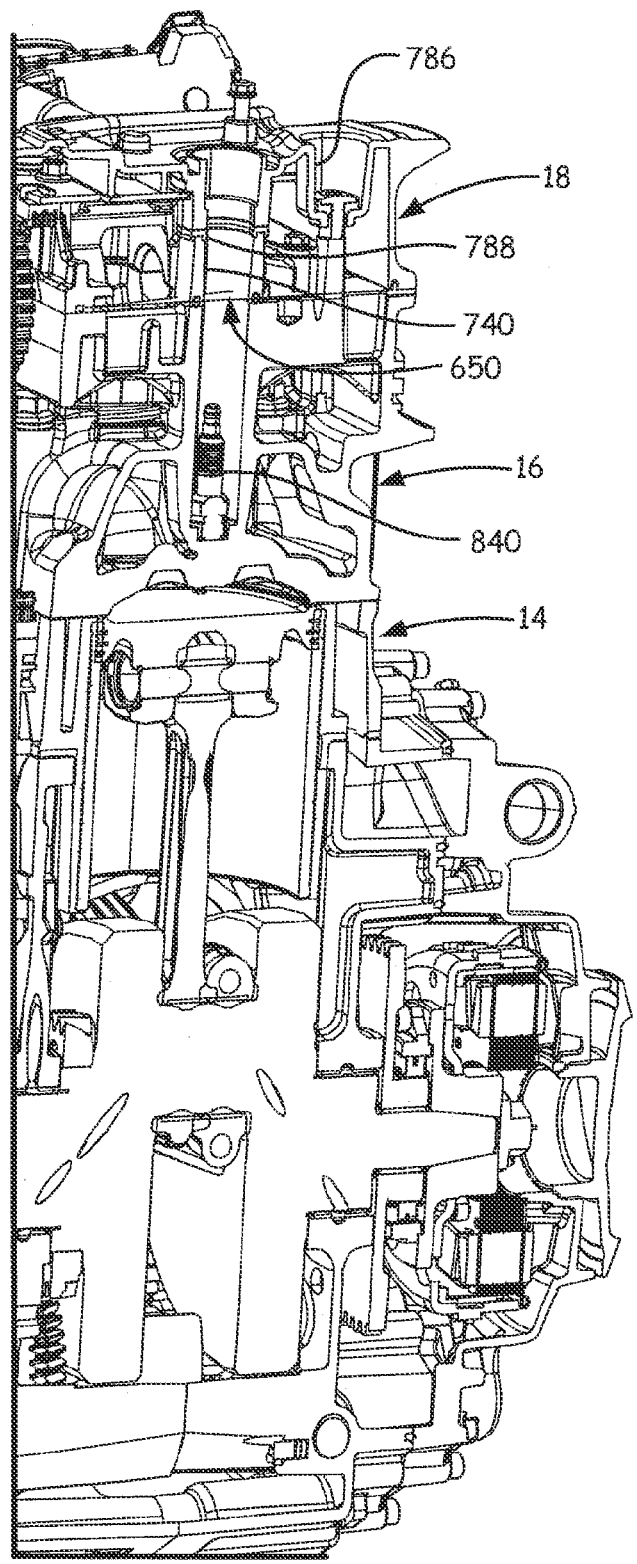
FIG. 30 is a cross-sectional view through the crank shaft of the power train and through the front cylinder assembly.

With reference now to FIGS. 25 and 30, the interaction of head 16, valve cover 18 and cam carrier 650 will be described. As shown, cam retainer 650 sits above head 16 and is positioned over the cams to retain the cams in the head. The cam carrier comprises an upstanding tubular wall 740 which defines the aperture 750. The upstanding tubular wall 740 defines the lower planar surface 744 (see FIG. 25) profiled to interface with an upper planar surface 550 of the head. A seal (see FIG. 30) is at the interface of the lower planar surface 744 of the upstanding tubular wall and the upper planar surface 550 of the head. Central cylindrical portion 740 is positioned over head 16 and in alignment with opening 582 (see FIG. 22). Valve cover 18 is shown positioned over cam carrier 650 such that aperture 784 (see FIG. 26) overlies the aperture 750. Seal 788 is in position over cylindrical portion 740 thereby sealing valve cover 18 to head 16, through the cam carrier 650.

Figure 29:
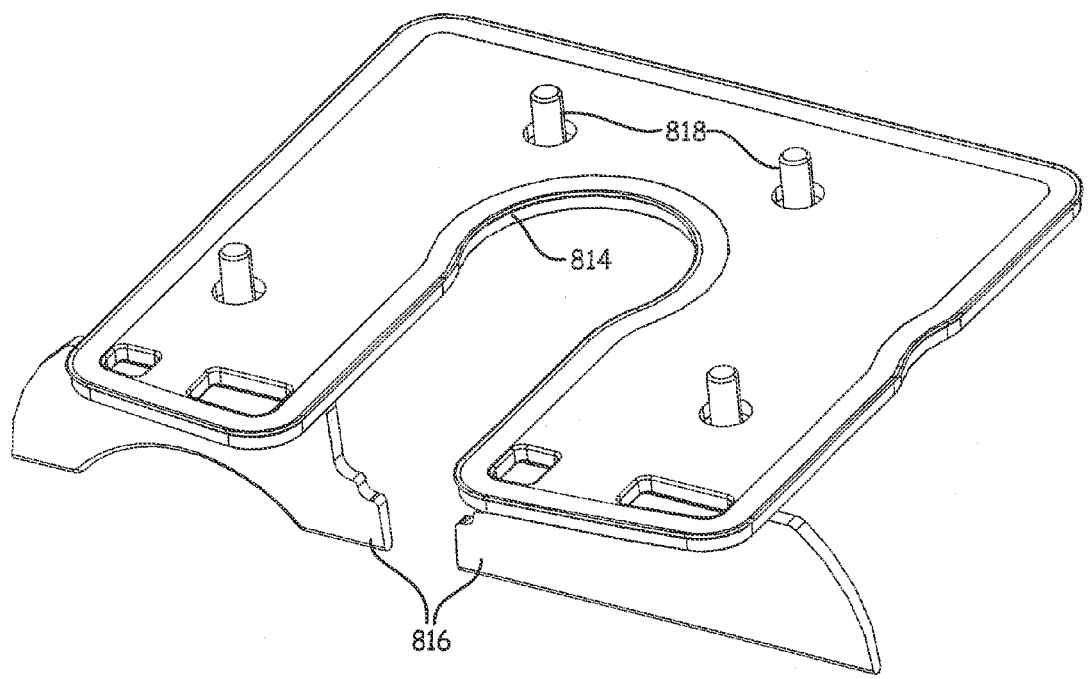
FIG. 29 is an upper perspective view of the baffle plate of FIG. 25.
Figure 31:
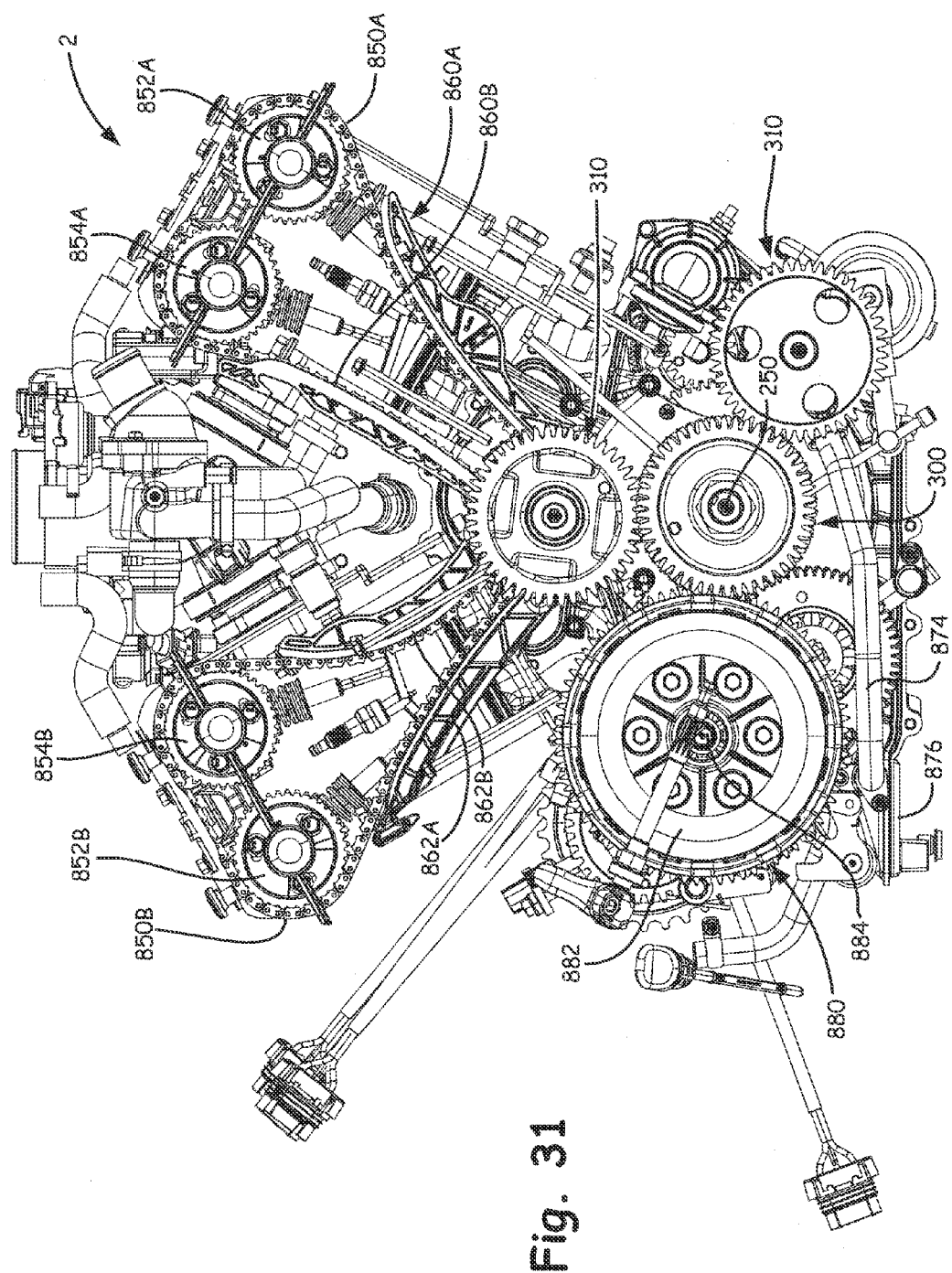
FIG. 31 is a right-side plan view of the engine of the present disclosure excluding the block and side covers.
Figure 32:
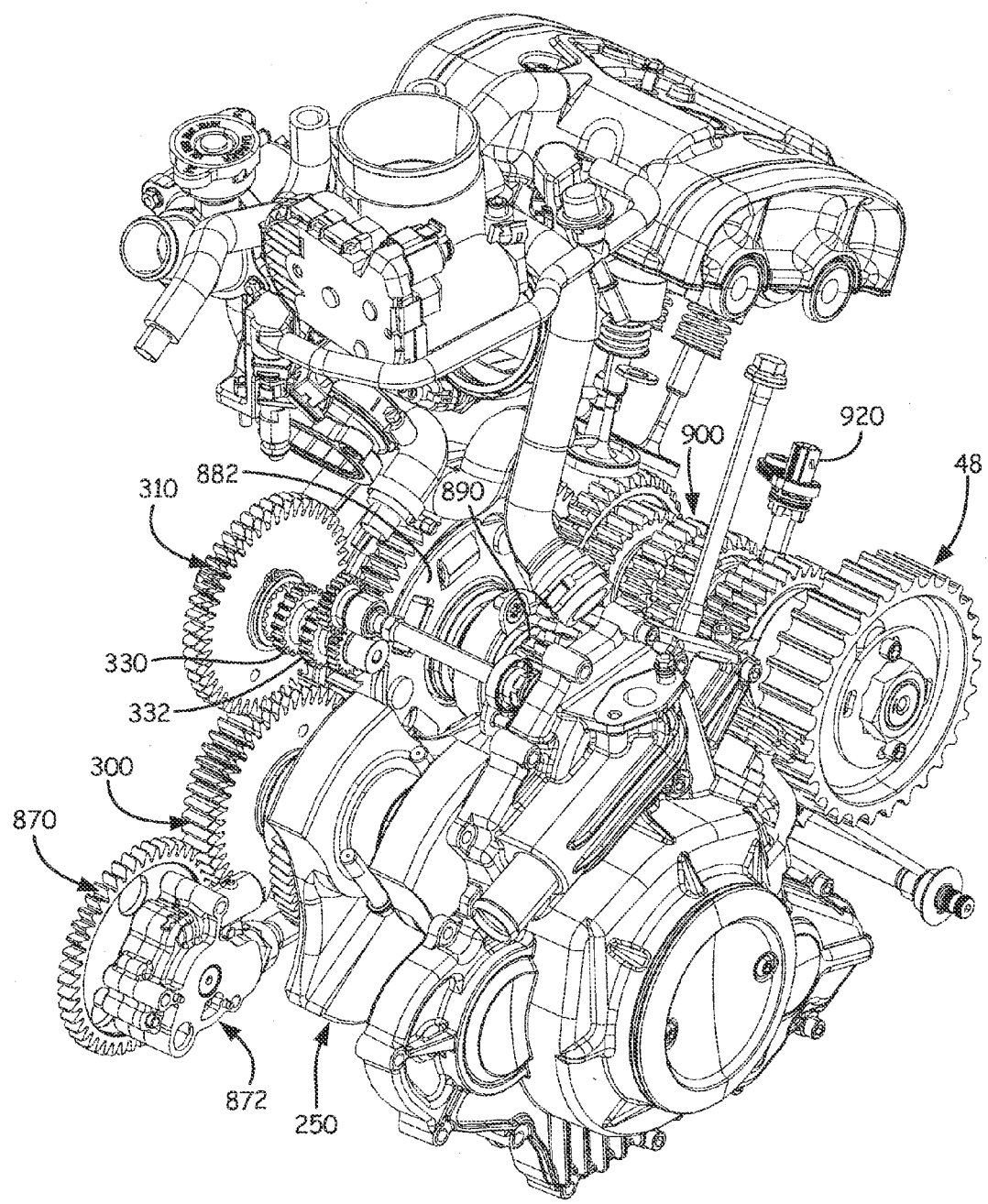
FIG. 32 is a front ride side perspective view showing the power train of the present disclosure less block.

With reference now to FIGS. 31 and 32, other aspects of the disclosure will now be described. As mentioned previously, drive gear 300 which is coupled directly to crank shaft 250 drives gear 310. As shown in FIG. 32, it was previously described that gear 310 drives gears 330 and gear 332, which ultimately drive cam chains. Cam chains 850a and 850b are shown in FIG. 29, which would be entrained to gears 330, 332, respectively. Power train 2 further includes an exhaust timing gear 852a and an intake timing gear 854a and exhaust timing gear 852b and intake timing gear 854b. Thus, timing chains extend through the passageways defined by individual passageway 210a (FIG. 3), passageways 462 (FIG. 13), and passageway 590 (FIG. 18). FIG. 29 also shows timing chain tensioners 860a, 860b, and 862b.

Figure 33:
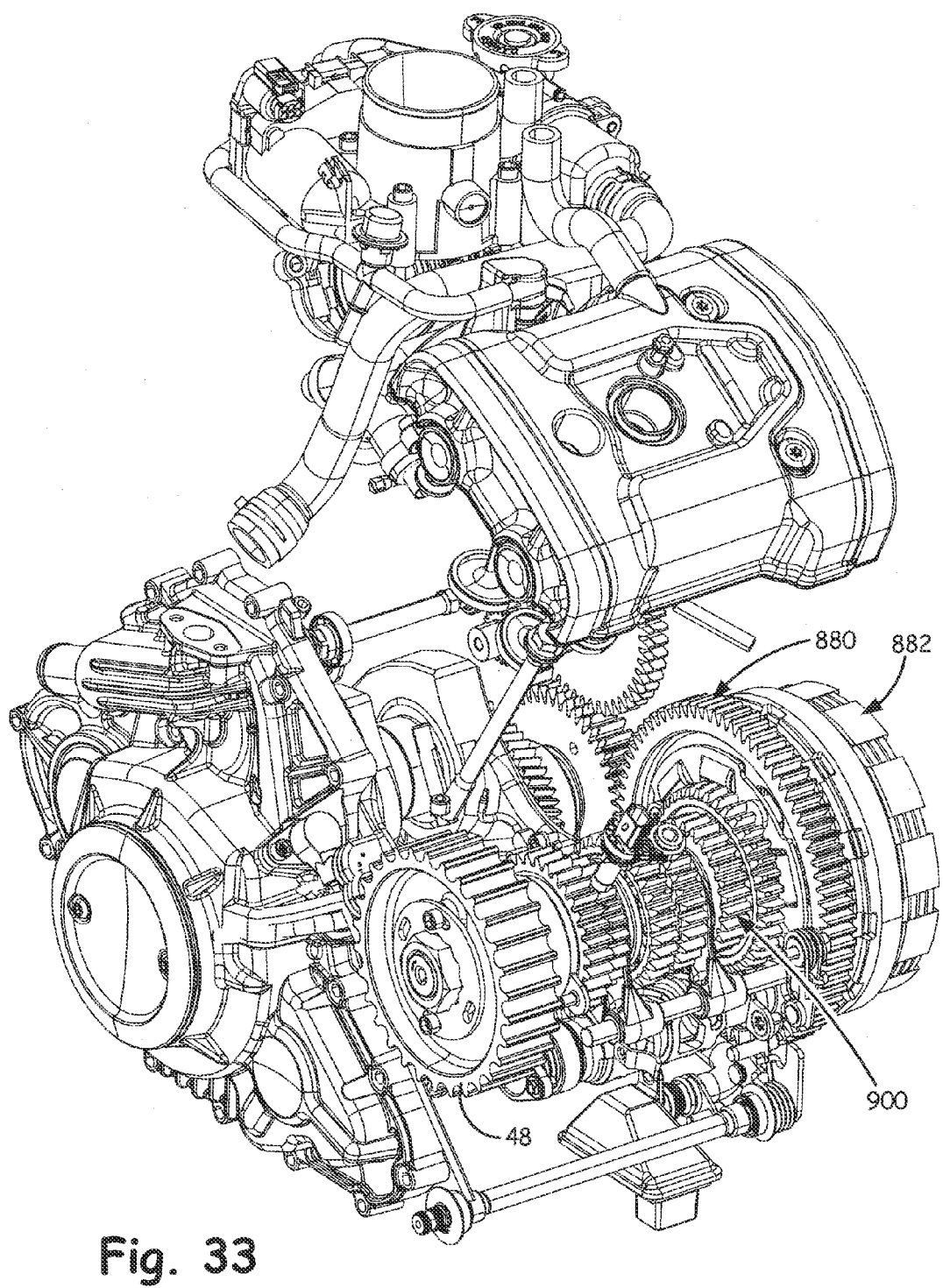
FIG. 33 is a left rear perspective view of the power train as shown in FIG. 31.

In addition, a front driven gear 870 is shown, which drives an oil pump 872 (FIG. 32), which is positioned generally and directly behind driven gear 870. Oil pump 872 has an oil pick up line 874 having a snorkel at 876 (see FIG. 31). In addition to driven gear 870, drive gear 300 also drives 880 (see FIG. 33), which drives clutch 882. Clutch 882 drives a shaft 884 (see FIG. 31) having a plurality of gears 890 in meshing engagement with a plurality of gears 900 (FIG. 32). Gears 900 are ultimately coupled to output sprocket 48 (see FIG. 32), which will be coupled to motorcycle rear wheel by way of a belt (not shown).

Thus, driven gear 300 drives multiple aspects of the power train from a single gear directly driven off of the crank shaft. As mentioned, driven gear 300 drives gear 310, which in turn drives both cam chains 850a and 850b, which in turn drives the overhead cams. In addition, drive gear 300 drives the water pump through the coupling engagement of the water pump drive shaft 350 to driven gear 310. Drive gear 300 further drives driven gear 870, which in turn drives oil pump 872. Finally as mentioned, drive gear 300 drives gear 880 driving clutch 882.

With reference again to FIG. 11B, the sealing between most interfacial components includes a press in place square bead seal, such as seal 910, which provides a robust seal eliminating leaks.

As shown in FIG. 32 a speed sensor 920 is provided, which moves laterally with the laterally movable gears.

Figure 34:
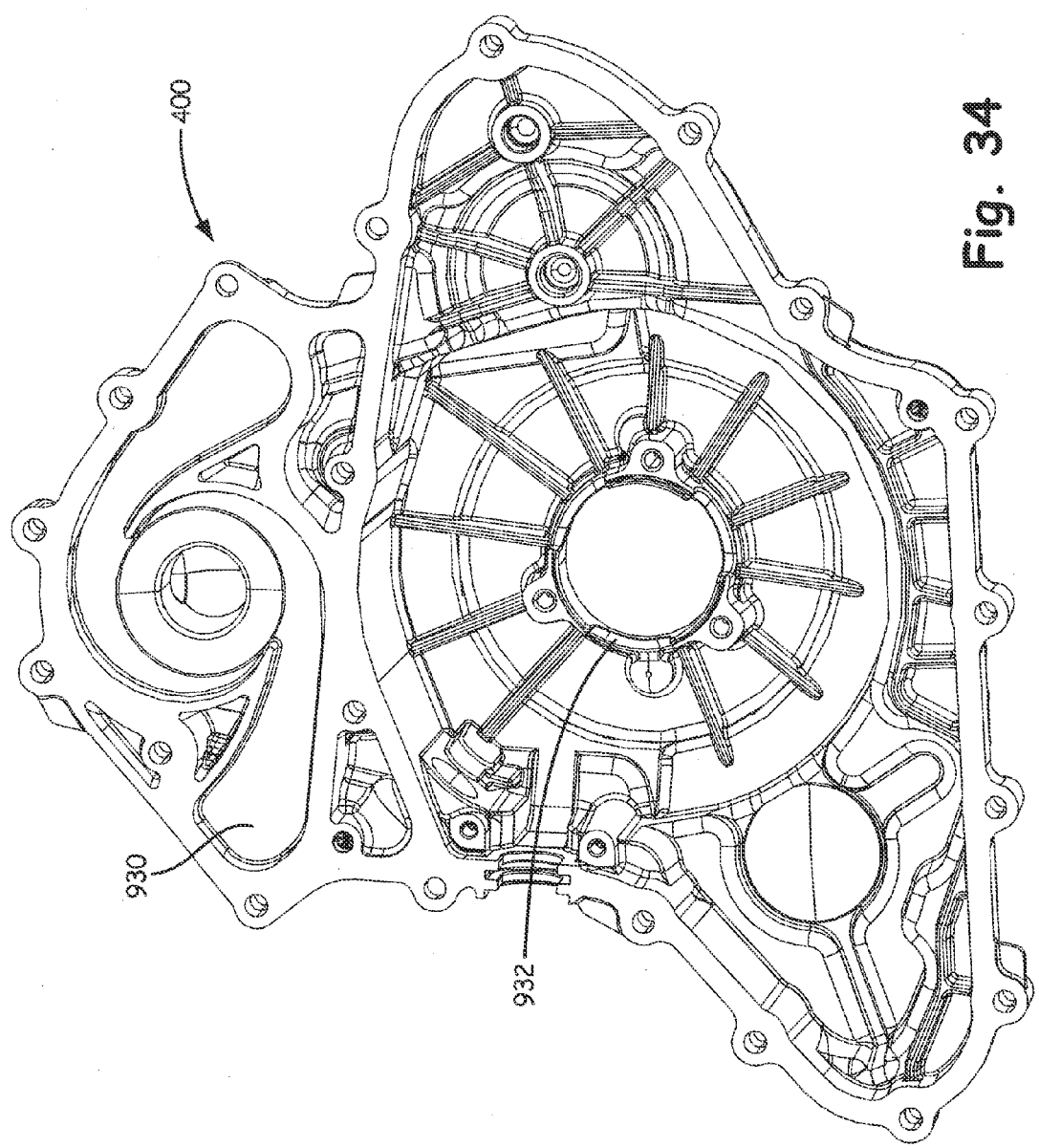
FIG. 34 shows an inner view of the combined water pump and generator cover.
Figure 35:
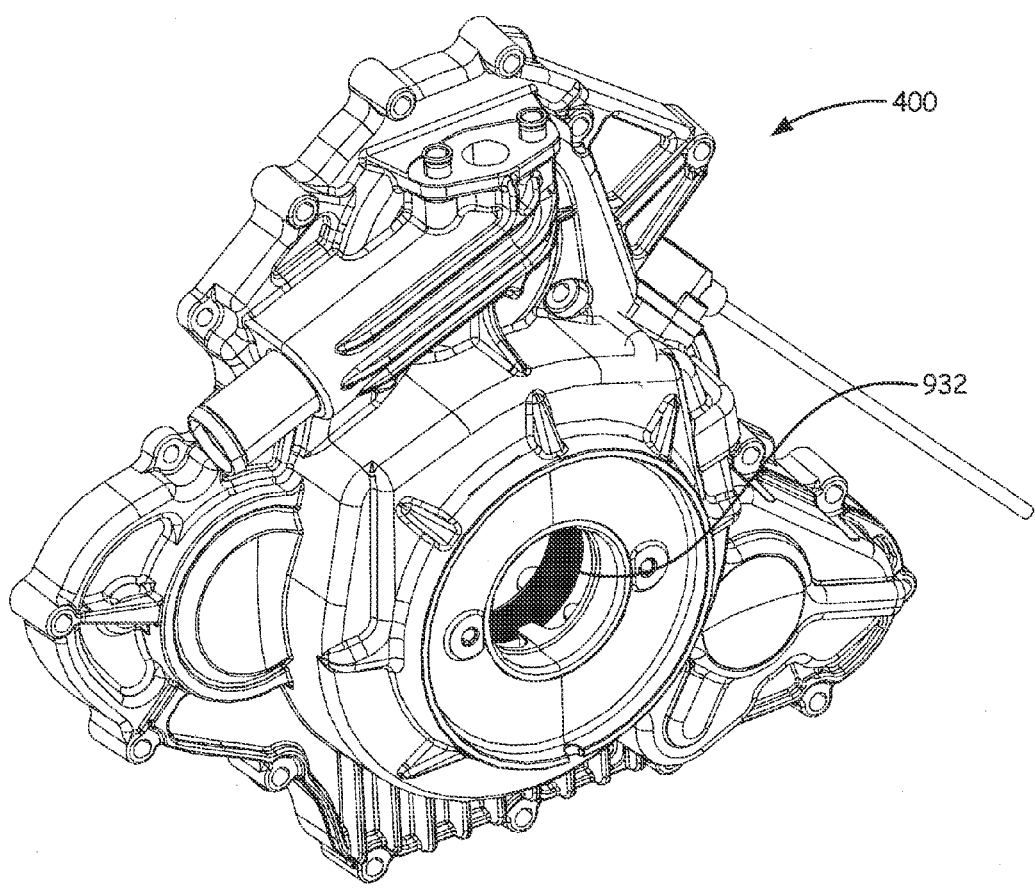
FIG. 35 shows an outer view of the combined water pump and generator cover.
Figure 36:
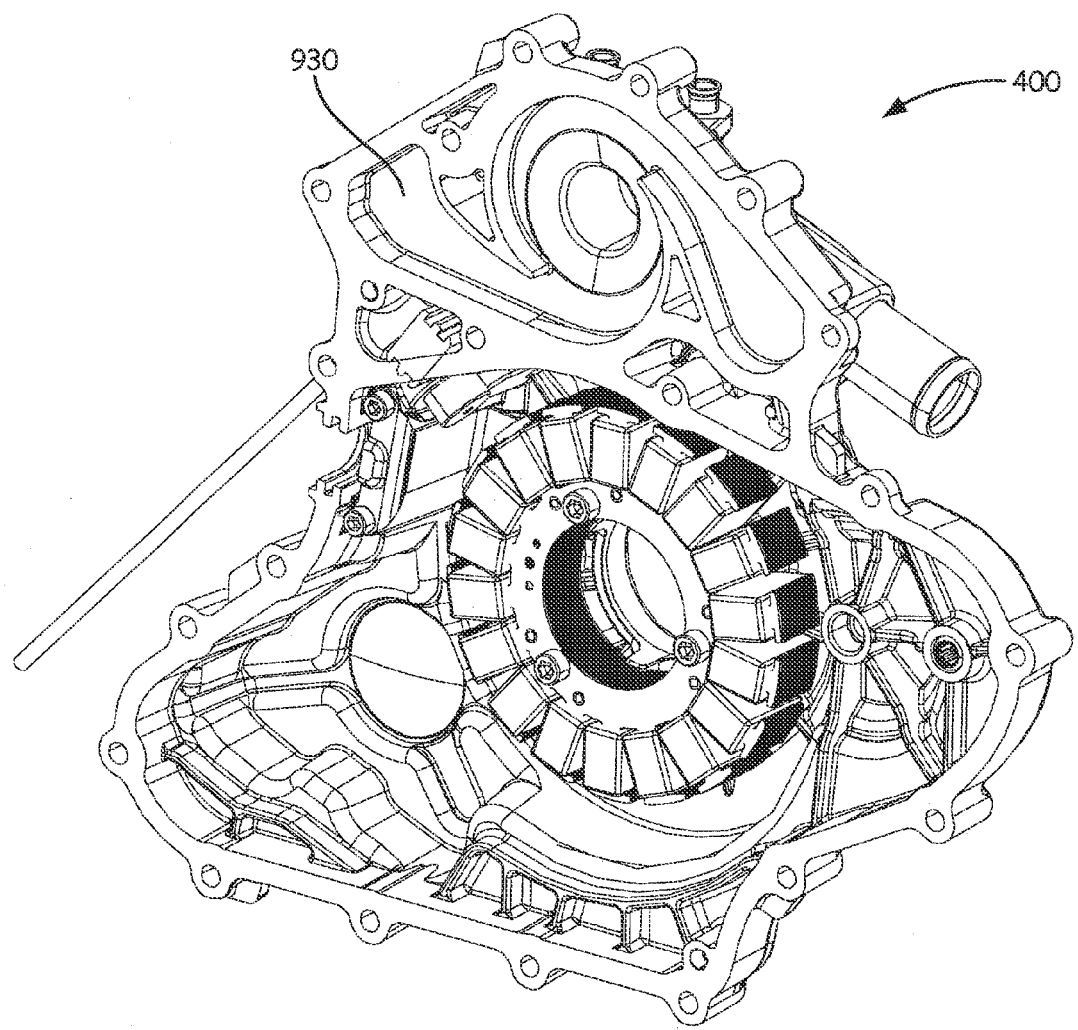
FIG. 36 shows a view similar to that of FIG. 34 showing the generator stator in position.

With reference to FIGS. 34-35, the water pump cover 400 is shown which includes a portion 930 to cover the water pump housing 170, and a portion 932 to cover the generator; the common cover makes the parts seem seamless. As shown in FIG. 2, the small cover or badge 940 is removable for testing purposes.

As mentioned above, the heads 16 could be of various sizes to accommodate different displacements. It is also possible to provide different aesthetic looking families, due to modularity of the components. For example, different cylinders, heads, valve covers, and other covers could be provided with different aesthetic looks, yet with similar coupling to the block 12.

The lubrication system of the present disclosure is similar to that shown and described in U.S. patent application Ser. No. 13/242,239 filed Sep., 23, 2011 (US Publication Number 20120073527), the subject matter of which is incorporated herein by reference. The difference is that the lubrication system also feeds the transmission shaft for the transmission.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:
1. An engine, comprising:
a crankcase profiled in a V-configuration;

a first cylinder having a first cylinder bore;
a second cylinder having a second cylinder bore;
a head positioned over each of the first and second cylinders;
a crankshaft journalled in the crankcase;
a first piston coupled to the crankshaft and positioned in the first cylinder to reciprocate therein;
a second piston coupled to the crankshaft and positioned in the second cylinder to reciprocate therein; and
a water pump coupled to the crankshaft, the water pump comprising a water pump housing, wherein at least a portion of the water pump housing including a wall of at least one convolute is defined in an outer face of the crankcase.

2. The engine of claim 1, wherein the water pump housing comprises an opening at the outer surface of the crankcase, and the water pump comprises an impeller positioned in the opening.

3. The engine of claim 2, wherein the water pump includes first and second convolutes extending from the water pump opening.

4. The engine of claim 3, wherein the convolutes are defined in the outer face of the crankcase.

5. The engine of claim 4, wherein an acute angle is defined by a first line drawn between a rotational axis of the crankshaft and a centerline of the first cylinder bore, and a second line drawn between the rotational axis of the crankshaft and a centerline of the second cylinder bore, and the water pump opening is within the acute angle.

6. The engine of claim 5, further comprising a water pump drive shaft having a drive end and an impeller end, the drive end of the water pump shaft is positioned on a first side of the crankcase and the impeller end of the water pump shaft is positioned on a second side of the crankcase.

7. The engine of claim 6, wherein the first and second cylinders are discrete from the crankcase and coupled to the crankcase at first and second interfaces.

8. The engine of claim 7, further comprising passageways, wherein the convolutes communicate through the crankcase to the first and second interfaces by way of the passageways.

9. The engine of claim 8, wherein the passageways comprise portions extending into the crankcase along an axis generally parallel with the rotational axis of the crankshaft.

10. The engine of claim 8, wherein at least one of the passageways comprises portions extending into the crankcase along an axis generally parallel with an axis of the first cylinder bore and at least another of the passageways comprises portions extending into the crankcase along an axis generally parallel with an axis of the second cylinder bore.

11. The engine of claim 8, wherein the first and second cylinders each include a water supply opening which communicates with the passageways.

12. The engine of claim 11, wherein the cylinders include an annular channel surrounding at least a portion of the cylinder, the annular channel in communication with the water supply opening, and an insert is positioned in the annular opening, the insert allowing a controlled flow of water flow therethrough, creating a damming effect.

13. The engine of claim 8, wherein the first and second line intersect the passageways.

14. The engine of claim 8, wherein the first and second lines generally bisect the passageways.

15. The engine of claim 8, further comprising a water pump cover coupled to the crankcase and enclosing the water pump opening, the convolutes and the passageways.

16. The engine of claim 1, further comprising camshafts rotatably positioned in the heads.

17. The engine of claim 16, wherein a drive gear is coupled to the crankshaft at the first side of the crankcase.

18. The engine of claim 17, further comprising a driven shaft, the driven shaft having a driven gear coupled to the drive gear.

19. The engine of claim 18, further comprising:
   a. first and second gears coupled to the driven shaft;
   b. first and second chains coupled to the first and second gears; and
   c. gears coupled to the camshafts and entrained with the first and second chains.

20. The engine of claim 19, further comprising a third gear coupled to the water pump drive shaft.

21. An engine, comprising:
   a crankcase profiled in a V-configuration;
   a first cylinder having a first cylinder bore;
   a second cylinder having a second cylinder bore;
   a head positioned over each of the first and second cylinders;
   a crankshaft journalled in the crankcase;
   a first piston coupled to the crankshaft and positioned in the first cylinder to reciprocate therein;
   a second piston coupled to the crankshaft and positioned in the second cylinder to reciprocate therein;
   a water pump coupled to the crankshaft, the water pump comprising a water pump housing, wherein at least a portion of the water pump housing is defined in an outer face of the crankcase, the water pump including first and second convolutes; and
   passageways positioned within the crankcase and in fluid communication with the first and second convolutes.

22. The engine of claim 21, further comprising a water pump drive shaft having a drive end and an impeller end, the drive end of the water pump shaft is positioned on a first side of the crankcase and the impeller end of the water pump shaft is positioned on a second side of the crankcase.

23. The engine of claim 21, wherein the first and second cylinders are discrete from the crankcase and coupled to the crankcase at first and second interfaces.

24. The engine of claim 21, wherein the passageways comprise portions extending into the crankcase along an axis generally parallel with the rotational axis of the crankshaft.

25. The engine of claim 21, wherein at least one of the passageways comprises portions extending into the crankcase along an axis generally parallel with an axis of the first cylinder bore and at least another of the passageways comprises portions extending into the crankcase along an axis generally parallel with an axis of the second cylinder bore.

\* \* \* \* \*